(12) United States Patent
Ober et al.

(10) Patent No.: US 11,881,598 B2
(45) Date of Patent: Jan. 23, 2024

(54) APPARATUS AND METHOD FOR CONNECTING ELECTRICAL COMPONENTS

(71) Applicant: OBERON TECHNOLOGIES INC., Calgary (CA)

(72) Inventors: Tanner Ober, Calgary (CA); Daniel Sieben, Calgary (CA); David Atkins-Apeldoorn, Calgary (CA); Rajiv Parmar, Calgary (CA); Roger Hull, Calgary (CA)

(*) Notice: Subject to any disclaimer, the term of this patent is extended or adjusted under 35 U.S.C. 154(b) by 112 days.

(21) Appl. No.: 17/039,501

(22) Filed: Sep. 30, 2020

(65) Prior Publication Data

US 2021/0143515 A1  May 13, 2021

Related U.S. Application Data

(60) Provisional application No. 62/908,085, filed on Sep. 30, 2019.

(51) Int. Cl.
*H01M 50/553* (2021.01)
*H01M 50/591* (2021.01)
(Continued)

(52) U.S. Cl.
CPC ....... *H01M 50/553* (2021.01); *H01M 50/209* (2021.01); *H01M 50/213* (2021.01);
(Continued)

(58) Field of Classification Search
CPC ........... H01M 50/20–216; H01M 50/233–242; H01M 50/289–358; H01M 50/50–538
See application file for complete search history.

(56) References Cited

U.S. PATENT DOCUMENTS 1,539,427 A * 5/1925 Rector ............... H01M 50/204
429/185
8,426,063 B2   4/2013 Lin
(Continued)

FOREIGN PATENT DOCUMENTS

EP   2443687        12/2012
JP   2001060465 A *  3/2001  ............. Y02E 60/10
JP   2007027011 A *  2/2007  ........ H01M 50/3425

OTHER PUBLICATIONS

Machine translation of Aoki et al. (JP 2007-027011). Originally published Feb. 1, 2007 (Year: 2007).*
(Continued)

*Primary Examiner* — Jonathan Crepeau
*Assistant Examiner* — Jacob Buchanan
(74) *Attorney, Agent, or Firm* — Parlee McLaws LLP

(57) ABSTRACT

A module for interconnecting electrical components such as batteries, fuel cells, capacitors, and resistors. The module has a body for retaining the electrical components, and terminal bulkheads capable of coupling with the body. The terminal bulkheads have cavities that define fluid reservoirs when the terminal bulkheads are coupled with the body, and gaskets that seal the fluid reservoirs. Electrical contacts of the terminal bulkheads contact the electrical components within the sealed fluid reservoir. The fluid reservoirs are filled with a fluid such that forces applied to the electrical components are dampened, and oxidation of electrical connections is mitigated through displacement of oxygen. The fluid can also be selected to neutralize chemicals that may leak from the electrical components. The electrical contacts can be interconnected with conductor buses such that the electrical components are connected in series, parallel, or a mixture of both.

20 Claims, 27 Drawing Sheets

(51) Int. Cl.
  *H01M 50/502* (2021.01)
  *H01M 50/209* (2021.01)
  *H01M 50/559* (2021.01)
  *H01M 50/213* (2021.01)
  *H01M 50/271* (2021.01)

(52) U.S. Cl.
  CPC ....... *H01M 50/271* (2021.01); *H01M 50/502* (2021.01); *H01M 50/559* (2021.01); *H01M 50/591* (2021.01)

(56) References Cited

U.S. PATENT DOCUMENTS

| | | | |
|---|---|---|---|
| 8,703,325 B2 | 4/2014 | Pellenc | |
| 2009/0181288 A1* | 7/2009 | Sato | H01M 50/507 429/57 |
| 2009/0297892 A1* | 12/2009 | Ijaz | H01M 50/213 219/121.64 |
| 2010/0009244 A1* | 1/2010 | Murata | H01M 10/613 429/53 |
| 2010/0116570 A1* | 5/2010 | Sugawara | B60L 58/16 429/82 |
| 2011/0135975 A1* | 6/2011 | Fuhr | H01M 50/24 429/88 |
| 2012/0148877 A1* | 6/2012 | Kalman | H01M 10/0481 429/7 |
| 2013/0089763 A1* | 4/2013 | Lee | H01M 50/258 429/82 |
| 2015/0140369 A1* | 5/2015 | Itoi | H01M 50/204 429/53 |
| 2015/0188203 A1* | 7/2015 | Enomoto | H01M 50/24 429/83 |
| 2017/0373287 A1 | 12/2017 | Yamashita et al. | |
| 2018/0123096 A1 | 5/2018 | McCarty | |

OTHER PUBLICATIONS

Machine translation of Iwata, JP-2001060465-A. Originally available Aug. 23, 1999. (Year: 1999).*
International Search Report and Written Opinion, PCT/CA2020/051309 dated Jan. 15, 2021, 8 pages.

* cited by examiner

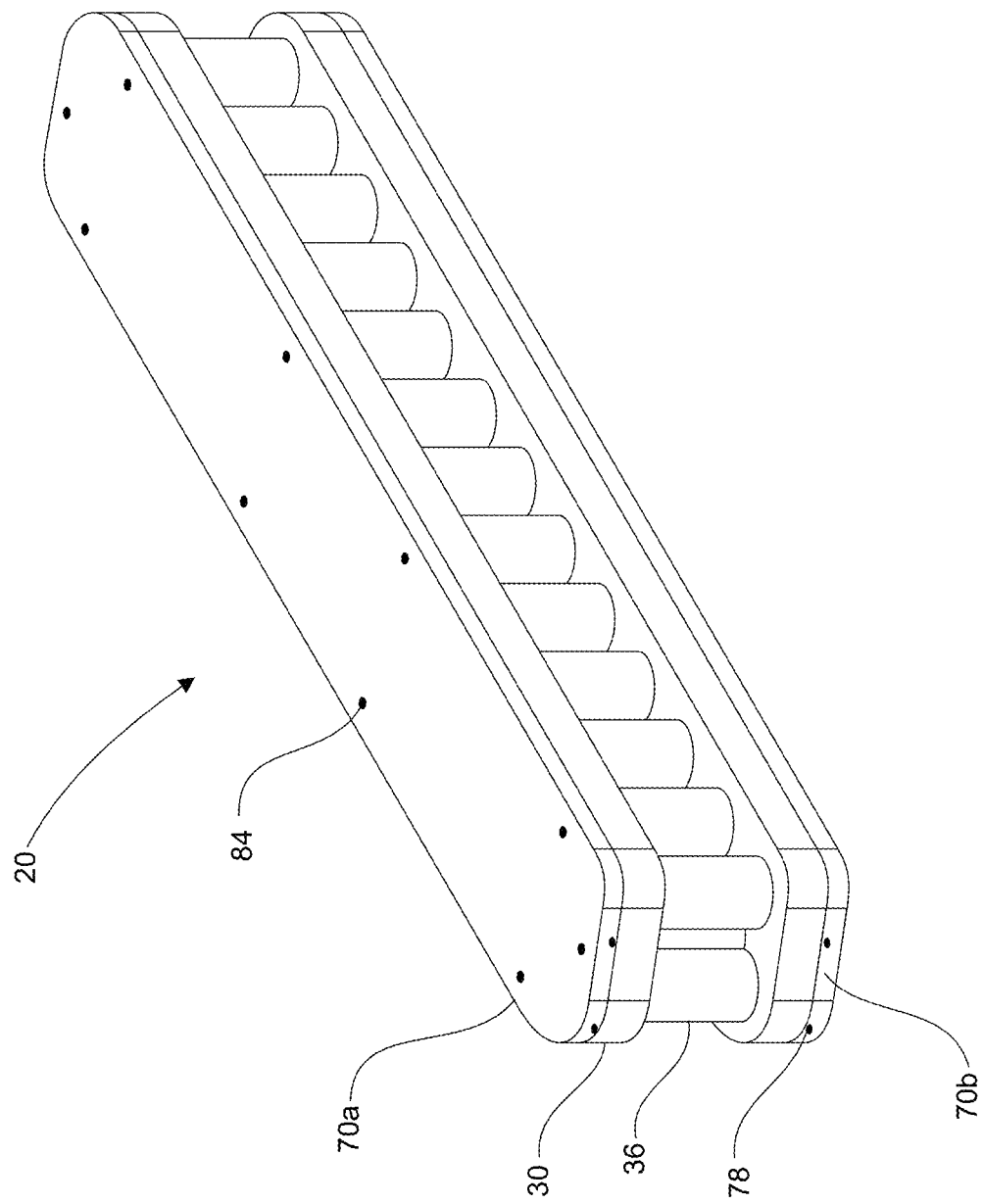

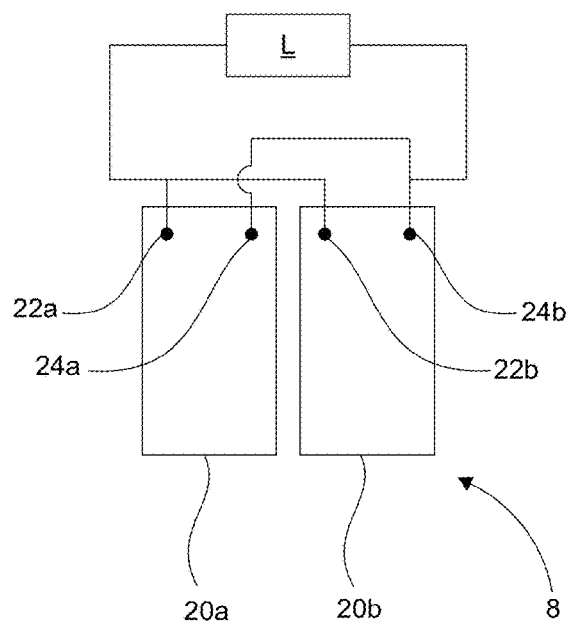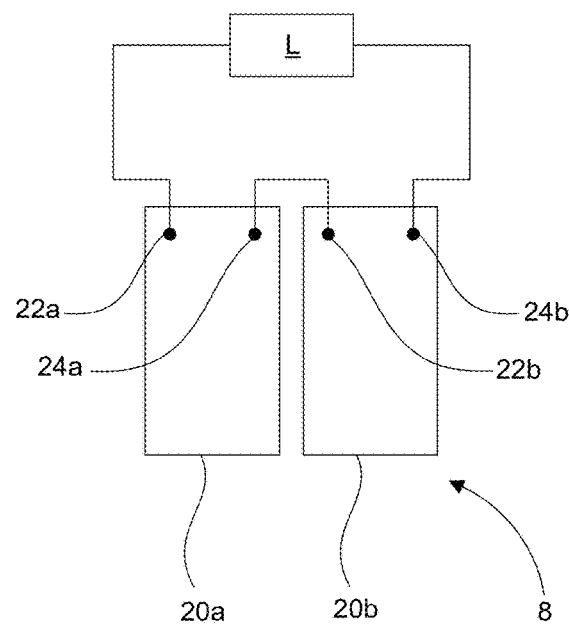
*Fig. 7A*  *Fig. 7B*

APPARATUS AND METHOD FOR CONNECTING ELECTRICAL COMPONENTS

CROSS-REFERENCE TO RELATED APPLICATIONS

This application claims the benefit of U.S. Provisional Application 62/908,085, filed Sep. 30, 2019, the entirety of which is incorporated fully herein by reference.

FIELD

Embodiments herein relate to apparatus and methods relating to storing and connecting electrical components, such as batteries, fuel cells, capacitors, resistors, fuses, and the like.

BACKGROUND

Electronic devices require an electrical power source to operate. One approach to providing such power to electronic devices is to incorporate a battery power system. For larger electronic devices, such as electric vehicles, the battery power system is typically comprised of a plurality of individual battery cells. Battery cells take many forms but are commonly provided as self-contained cells with an external cathode and an external anode, or collectively, external terminals or contacts. Battery cells can come in cylindrical or coin-shaped cells having terminals at opposing ends, or cells having both terminals located at one end such as prismatic and fuel cells.

The voltage potential of a battery cell is largely determined by the chemical composition of the particular cell and, more specifically, the associated electrochemical reactions therein. A battery power system typically comprises multiple uniform battery cells and can be configured in an array to provide voltage potentials representing multiples of the voltage potential of a single battery cell. The potential of the battery array can be increased by connecting one or more of the battery cells in series. The overall power capacity of the array can be also increased by connecting one or more of the battery cells in parallel.

To construct an array of battery cells, the external contacts of the battery cells must be electrically connected. The external contacts can be either directly connected to each other or connected via electrical conductors such as wires, conductive strips, busses, and the like.

One method of connecting the terminals of battery cells is via welding, such as spot welding a conducting bus bar to the terminals, or molded components, such as heat shrink wrapping, in a somewhat permanent manner. This method of connection securely connects the terminals of the battery cells but makes the replacement or maintenance of individual constituent battery cells difficult.

Alternatively, another method of connecting the battery cell terminals that enables easier replacement of individual battery cells is to house the battery cells in a battery module having a housing structure with separable components so as to permit access to the battery cells, as well as removal and replacement of individual cells. These separable housing components can be connected in any manner including by fastening means, hinges and latches, interlocking tracks, and the like. The battery terminals can be connected via electrical conductors of the housing, for example a first electrical conductor bus connecting all of the anode terminals of the batteries and a second electrical conductor bus connecting all of the cathode terminals, such that all of the batteries are connected in parallel. In order to maintain electrical conductivity between the terminals, constant physical contact between the terminals of the battery cells with the conductors is required. However, it is desirable for such connections to be non-permanent such that individual batteries can be removed and replaced if required. It is known to use biased compressive elements such as springs or tabs to maintain physical contact between the conductors and battery terminals, such as those employed in the device disclosed in U.S. Pat. No. 8,426,063 to Lin. In U.S. patent application Ser. No. 15/335,766 to McCarty, magnets were used to help maintain physical contact.

Such non-permanent connections of battery cells are susceptible to temporary loss of contact between the terminals and conductors due to external forces, such as sudden jarring movements. In turn, such loss of contact generates heat and results in increased oxidation and corrosion of the terminals. The increased oxidation and corrosion of the terminals results in increased resistance, which again generates additional heat, exacerbating the oxidation and corrosion problem.

In U.S. Pat. No. 8,703,325 to Pellenc, conductive contact grease was used for enhancing conduction between the conductors and the battery terminals and mitigating corrosion at the contact points over a long period of use. The use of conductive grease only partially addresses the corrosion issue, as it does not mitigating the loss of contact between the battery terminals and the conductor due to vibrations, such loss of contact exposing the contact materials beneath the grease and rendering them susceptible to oxidation and corrosion.

Another problem with battery modules is that, in the event of individual cells becoming damaged, corrosive and combustible chemicals may leak into other areas of the module, potentially damaging other cells or causing failure and/or injury.

Thus, there remains a need for a battery system that allows easy replacement of constituent battery cells while providing non-permanent battery terminal connections that are less susceptible to temporary disconnection, oxidation, and corrosion, and are also capable of mitigating damage caused by individual damaged cells.

SUMMARY

Embodiments of a system, apparatus, and method are provided herein for connecting a plurality of electrical components, such as batteries. A module is provided to house the plurality of electrical components and establish non-permanent electrical connections with the electrical components. The module comprises one or more terminal bulkheads having one or more fluid reservoirs within which the electrical connections with the electrical components are made. The fluid reservoirs are filled with a fluid, such that the forces experienced by the electrical components due to vibrations and the like are dampened, decreasing the likelihood of disconnection of the electrical contact with the electrical components. Further, air can be displaced from the fluid reservoirs as they are filled with the fluid, thus mitigating oxidation of the electrical contacts of the module and the terminals of the electrical components. The fluid can also be selected to mitigate damage caused by harmful chemicals, such as battery electrolytes, leaking from the electrical components.

Multiple configurations of the module are disclosed, including embodiments capable of housing and connecting electrical components having terminals located at opposing ends, such as cylindrical battery cells, and components having terminals located at the same end, such as prismatic battery cells and fuel cells. Conductor buses of the modules can be configured to connect the electrical components housed in the module in parallel, series, or a mixture of both.

The fluid can be conductive or non-conductive, and selected to: (i) create a dampening force to reduce temporary disconnections resulting from extreme momentary forces; (ii) neutralize, remove, or dilute contaminants and corrosive fluids; and (iii) reduce the risk of combustion with oxygen if one of cells were to rupture.

In a general aspect, a module for interconnecting a plurality of electrical components is provided, each of the electrical components having a first terminal and a second terminal, the module comprising: a housing configured to contain the plurality of electrical components; and one or more terminal bulkheads connected to the housing and having a plurality of electrical contacts residing within one or more cavities defined in the one or more terminal bulkheads, the plurality of electrical contacts adapted to contact the electrical components; one or more conductor buses each electrically connecting two or more of the plurality of electrical contacts; and one or more gaskets; wherein when the housing and the one or more terminal bulkheads are coupled, the one or more cavities cooperate with the housing, the plurality of electrical components, and the one or more gaskets to define one or more fluid reservoirs; and wherein the one or more fluid reservoirs are filled with a fluid.

In an embodiment, the one or more conductor buses are configured to electrically connect the plurality of electrical contacts such that the plurality of electrical components are electrically connected in series.

In an embodiment, the one or more conductor buses are configured to electrically connect the plurality of electrical contacts such that the plurality of electrical components are electrically connected in parallel.

In an embodiment, the one or more terminal bulkheads further comprise one or more removable terminal covers.

In an embodiment, the one or more terminal bulkheads further comprise one or more gasket holders and the one or more gaskets are retained in the one or more gasket holders.

In an embodiment, the module further comprises one or more fluid ports formed in one or both of the one or more terminal bulkheads and the housing, and in communication with the one or more fluid reservoirs.

In an embodiment, each of the one or more fluid reservoirs is in communication with at least two of the one or more fluid ports.

In an embodiment, the housing has first and second ends connected by an intermediate portion, the housing defining a plurality of apertures configured to receive the plurality of electrical components.

In an embodiment, the plurality of electrical components each have the first terminal located at a first end of the electrical component and the second terminal located at a second end of the electrical component opposite the first end; the plurality of apertures comprise a plurality of first apertures defined in the first end of the housing, and a plurality of second apertures defined in the second end of the housing opposite the first end of the housing; and the one or more terminal bulkheads comprise a first terminal bulkhead configured to be secured to the first end of the housing and a second terminal bulkhead configured to be secured to the second end of the housing.

In an embodiment, the plurality of electrical components each have the first terminal and the second terminal located at a first end; the plurality of apertures are defined in the first end of the housing; the one or more terminal bulkheads comprise a first terminal bulkhead configured to be secured to the first end of the housing.

In an embodiment, the fluid is a non-conductive fluid.

In an embodiment, the plurality of electrical components are one the group of batteries, fuel cells, fuses, capacitors, and resistors.

In another general aspect, a method of assembling a module for interconnecting a plurality of electrical components is provided, each of the electrical components having a first terminal and a second terminal, the method comprising: positioning the plurality of electrical components in the housing; coupling one or more terminal bulkheads having one or more gaskets to the housing such that a plurality of electrical contacts of the one or more terminal bulkheads contact the electrical components, wherein the one or more terminal bulkheads cooperate with the housing, the plurality of electrical components, and the one or more gaskets to define one or more fluid reservoirs; and introducing a fluid into the one or more fluid reservoirs.

In an embodiment, the method further comprises electrically connecting the plurality of electrical contacts with one or more conductor buses such that the plurality of electrical components are electrically connected in parallel.

In an embodiment, the method further comprises electrically connecting the plurality of electrical contacts with one or more conductor buses such that the plurality of electrical components are electrically connected in series.

In an embodiment, the step of introducing the fluid into the one or more fluid reservoirs comprises applying the fluid to one or more cavities defined in the one or more terminal bulkheads, the one or more cavities cooperating with the housing, the plurality of electrical components, and the one or more gaskets to define the one or more fluid reservoirs.

In an embodiment, the step of introducing the fluid into the one or more fluid reservoirs comprises introducing the fluid through a first fluid inlet and displacing air through a first fluid outlet of each of the one or more fluid reservoirs.

In an embodiment, the step of positioning the plurality of electrical components in the housing comprises positioning the plurality of electrical components in an alternating polarity.

In an embodiment, the step of coupling the one or more terminal bulkheads to the housing further comprises coupling one or more terminal covers to the housing.

In an embodiment, the step of coupling the one or more terminal bulkheads to the housing further comprises coupling one or more gaskets to one or more gasket holders and coupling the one or more gasket holders to the housing.

BRIEF DESCRIPTION OF THE DRAWINGS

FIG. 6 is perspective view of an embodiment an assembled battery module illustrating fluid ports;

FIG. 7A is a schematic representation of a battery system having two battery modules connected in parallel;

FIG. 7B is a schematic representation of a battery system having two batter modules connected in series;

DETAILED DESCRIPTION

The present disclosure relates to embodiments of a battery system having one or more battery modules comprised of a plurality of constituent battery cells, and methods of assembly and use thereof. The battery cells are interconnected in series, parallel, or both via non-permanent electrical connections and the terminals of the batteries are encompassed in one or more fluid-filled reservoirs for dampening movement of the cells as a result of external forces, mitigating corrosion of the battery terminals and electrical contacts, and/or neutralizing or diluting chemicals that may have leaked from damaged cells. One or more battery modules can be connected in series or parallel to form an energy storage pack.

The terms "top" and "bottom" refer to the ends of the system consistent with its orientation in the figures. A person of skill would appreciate that the battery system can be used in any suitable physical orientation.

The term "fastening means" or "fastener" refers to screws, nuts and bolts, latches, interlocking tracks or any other appropriate means for joining two components together for a particular application.

Figure 1:
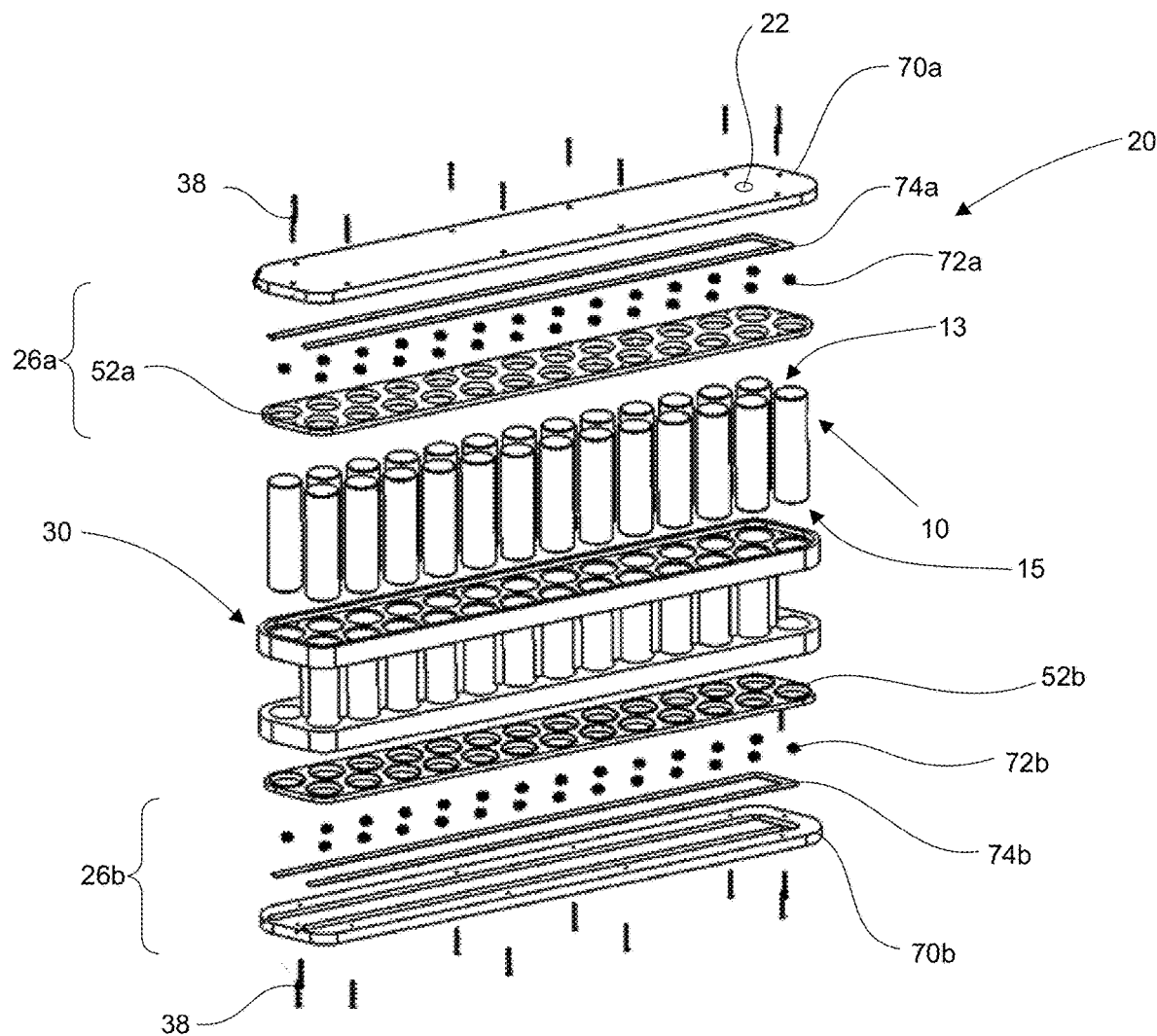
FIG. 1 is an exploded perspective view of an embodiment of a battery module containing cylindrical cells.

With reference to FIG. 1, an embodiment of a battery module assembly 20 of a battery system 8 comprises a plurality of battery cells 10 housed and electrically connected within the module 20, each battery cell 10 having a first or cathode terminal 12 and a second or anode terminal 14. The first and second cell terminals 12,14 can be located at respective first and second ends 13,15 of the cells 10, such as in the case of cylindrical cells, or the terminals 12,14 can be located at the same end, such as in the case of prismatic cells, fuel cells, and the like. The cells 10 can be connected in series, parallel, or both depending on the requirements of the particular application. As shown in FIGS. 7A and 7B, external cathode and anode terminals 22,24 of the module 20 permit electrical connection to electrical loads L, such as appliances, electric vehicles, and the like, or to other modules 20. FIG. 7A depicts a pair of modules 20a,20b with their cathode and anode terminals 22a,22b,24a,24b connected in parallel. FIG. 7B depicts a pair of modules 20a,20b connected in series. Mounting means such as frames and brackets may be used to facilitate electrical and mechanical connection between multiple modules 20.

A person of skill would understand that the cells 10 can be any type of electrochemical cell, including nickel metal hydride (NiMH) cells, lithium (Li) cells and polymer cells. While the embodiments depicted in the figures illustrate cylindrical cells and rectangular prismatic cells, a person of skill would appreciate that the module assembly 20 can be adapted to accommodate battery cells 10 of any size and geometry including prismatic, cylindrical, or polygonal. Further, modules 20 can also be used to interconnect other electrical components such as capacitors, fuses, resistors, and the like.

In the depicted embodiments in FIGS. 1 to 13E and FIGS. 17A to 17D, the battery module 20 comprises a housing 30 and one or more terminal bulkheads 26 each bulkhead having one or more gaskets 50 and one or more terminal covers 70, each of which will be described in greater detail below.

Figure 4:
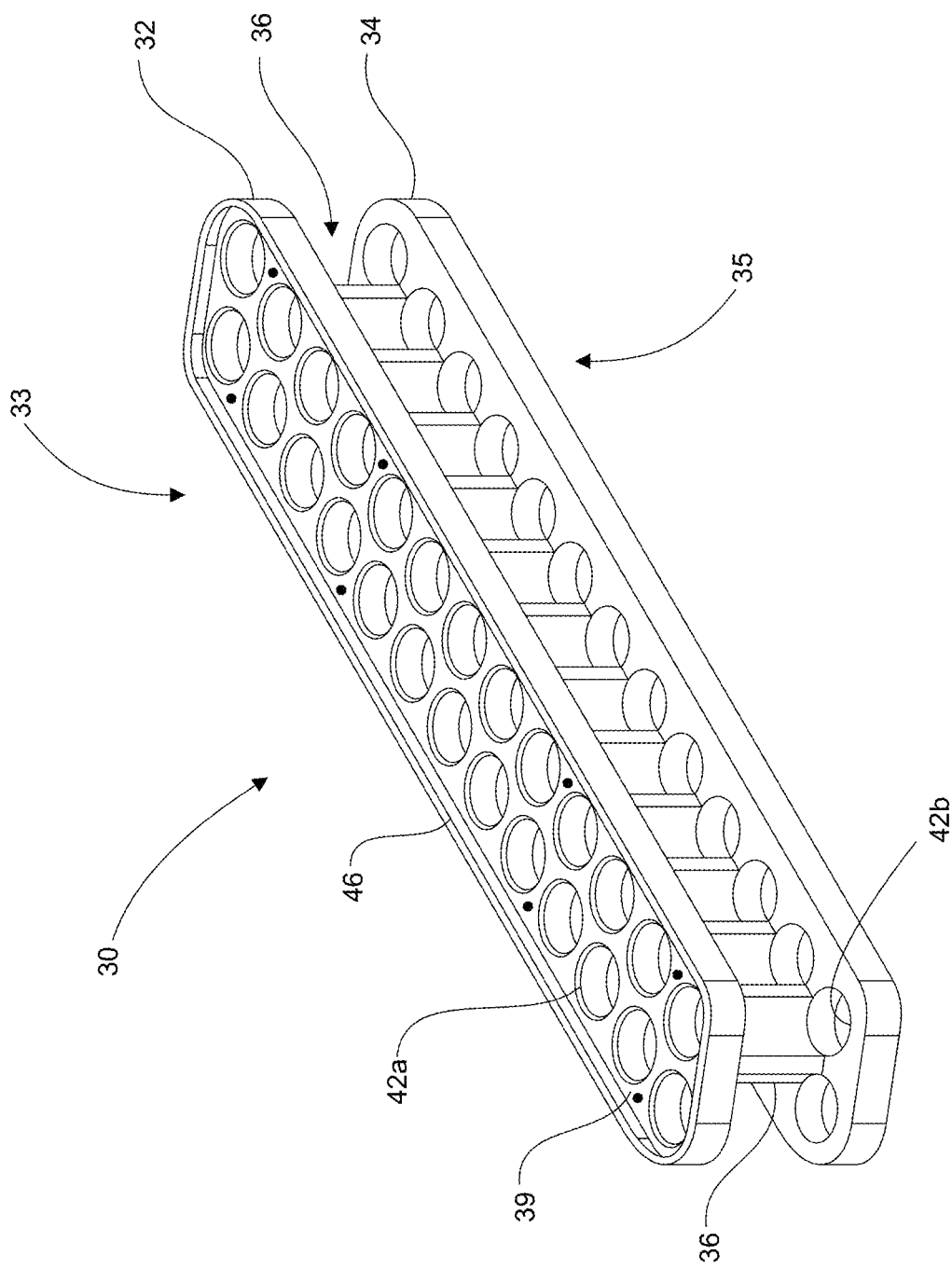
FIG. 4 is a perspective view of an embodiment of a housing assembly of the battery module of FIG. 1.

With reference to FIG. 4, the module housing 30 comprises a first or top portion 32 located at a first end 33, a second or bottom portion 34 located at a second end 35, and an intermediate portion 36 connecting the first and second portions 32,34. Connection or fastening means 38 can be provided to secure other components such as the terminal covers 70 and gaskets 50 to the housing 30. For example, connection means 38 can comprise threaded fasteners such as screws, nuts and bolts, latches, clips straps, and the like. In the depicted embodiment, the top and bottom portions 32,34 have housing connection holes 39 extending therethrough for receiving connection means 38 such as mounting bolts. The connection means 38 provide easy and reliable disassembly of the module 20 for accessing the cells 10, such as for replacement purposes. When cells 10 are retained in the housing 30 and the first and second portions 32,34 are coupled with the bulkheads 26a,26b, the internal components of the module 20 are fluidly sealed therein. The module housing 30 can be made from any suitable electrically non-conductive material including, but not limited to, a polymer or a composite.

The intermediate portion 36 connects the top and bottom portions of the housing 32,34 and is configured to receive and withstand tensile forces between the portions 32,34, such as when the module 20 is fully assembled and the terminal covers 70 apply a contact/holding force on the cells 10 therein. In the embodiment depicted in FIGS. 1 to 6 and FIGS. 17A to 17D, the intermediate portion 36 comprises a plurality of hollow columns or receptacles 40 configured to receive the cells 10 therethrough. The columns 40 can be open, as shown, or closed such as the cells 10 are completely enclosed in the module 20 once it is fully assembled. In other embodiments, the intermediate portion 36 can comprise members that do not house the cells 10, and merely serve as a mechanical connection between the top and bottom portions 32,34 and withstand tensile forces. As shown in FIGS. 8 and 11A to 13E, in embodiments, the intermediate portion 36 can comprise a sidewall and inner walls enclosing the cells 10 within the module 20.

Figure 8:
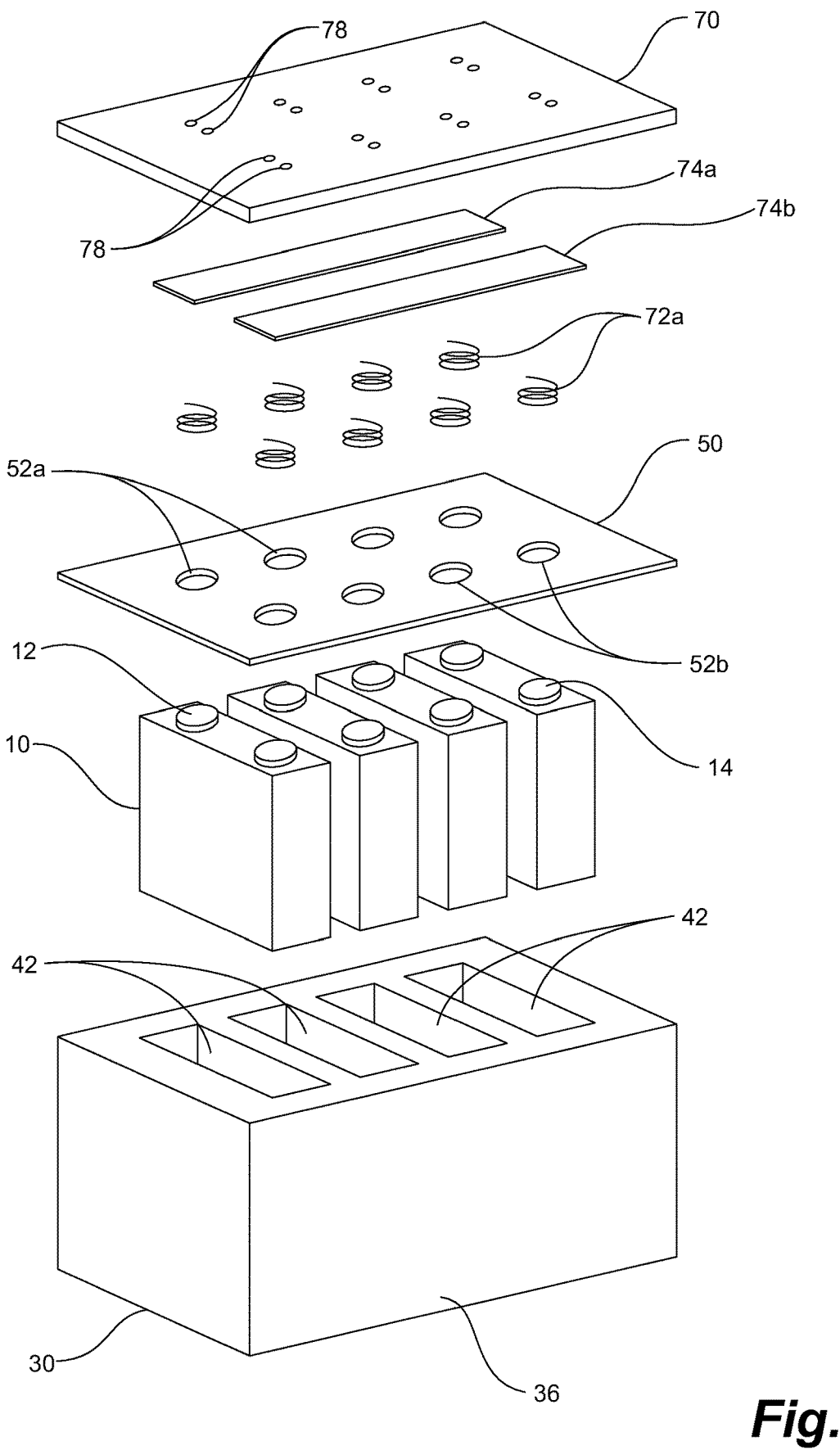
FIG. 8 is an exploded perspective view of an embodiment of a battery module containing prismatic or fuel cells.
Figure 11A:
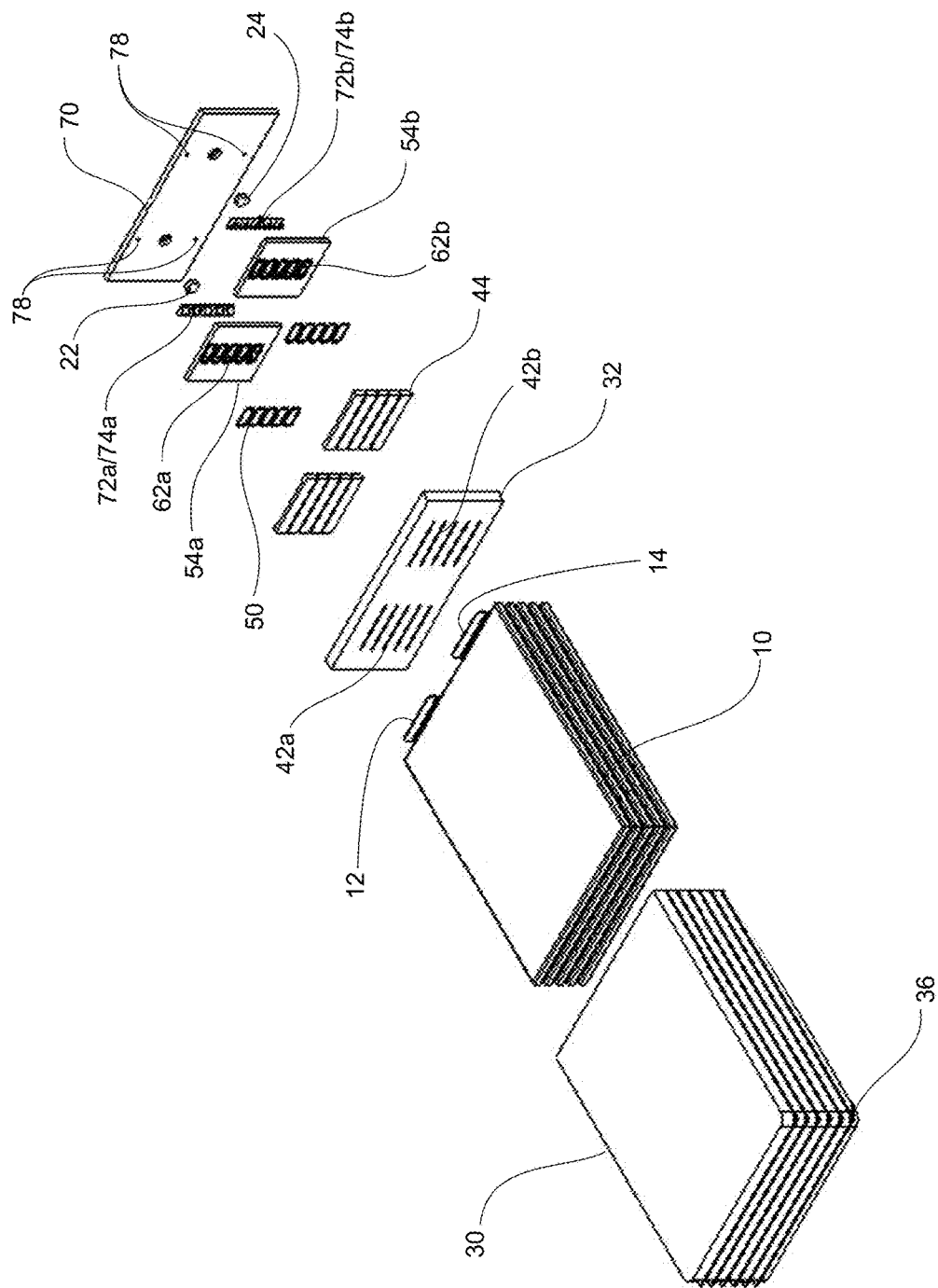
FIG. 11A is a bottom exploded perspective view of an embodiment of a battery module containing prismatic cells.
Figure 11B:
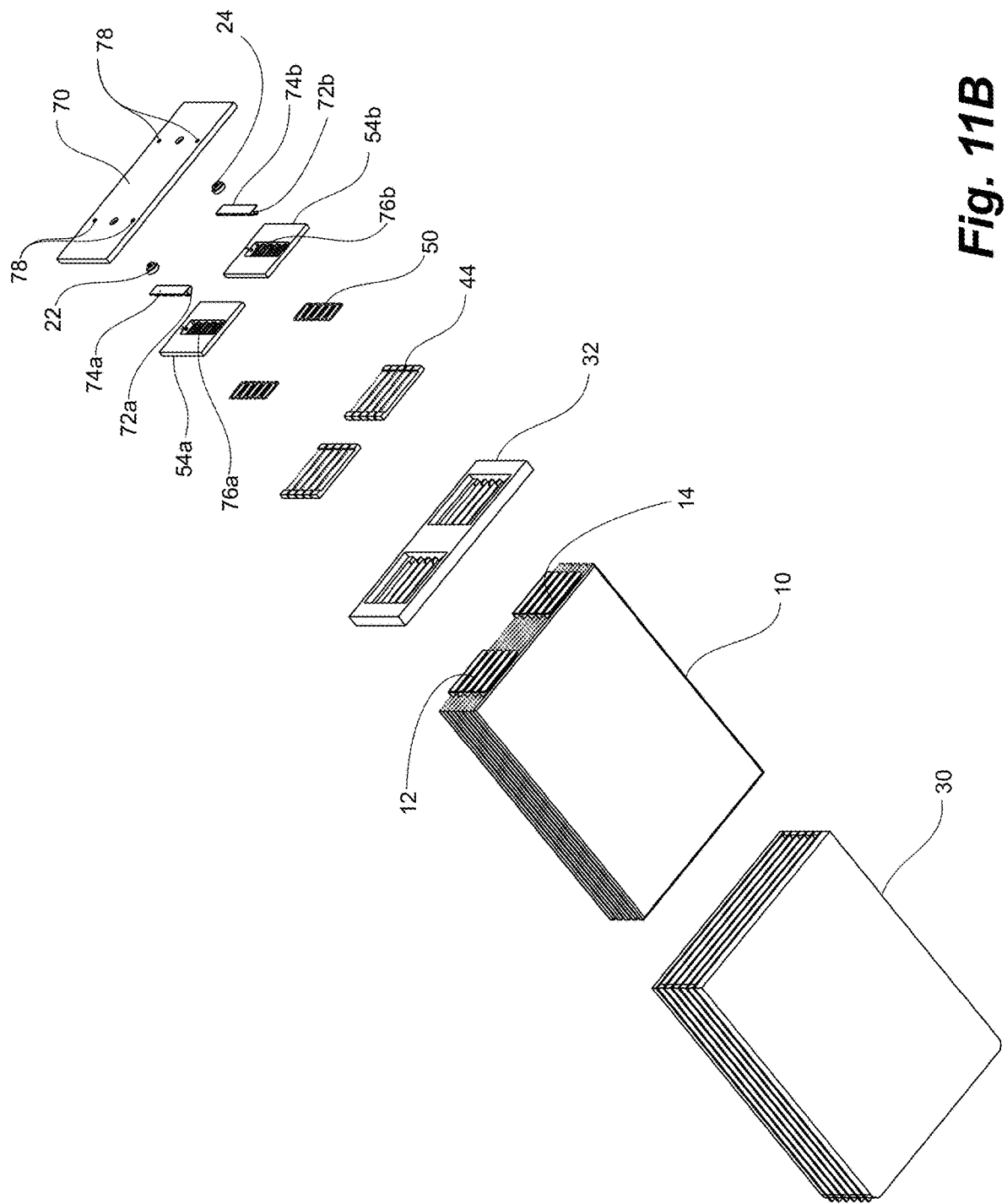
FIG. 11B is a top exploded perspective view of the battery module of FIG. 11A.
Figure 12A:
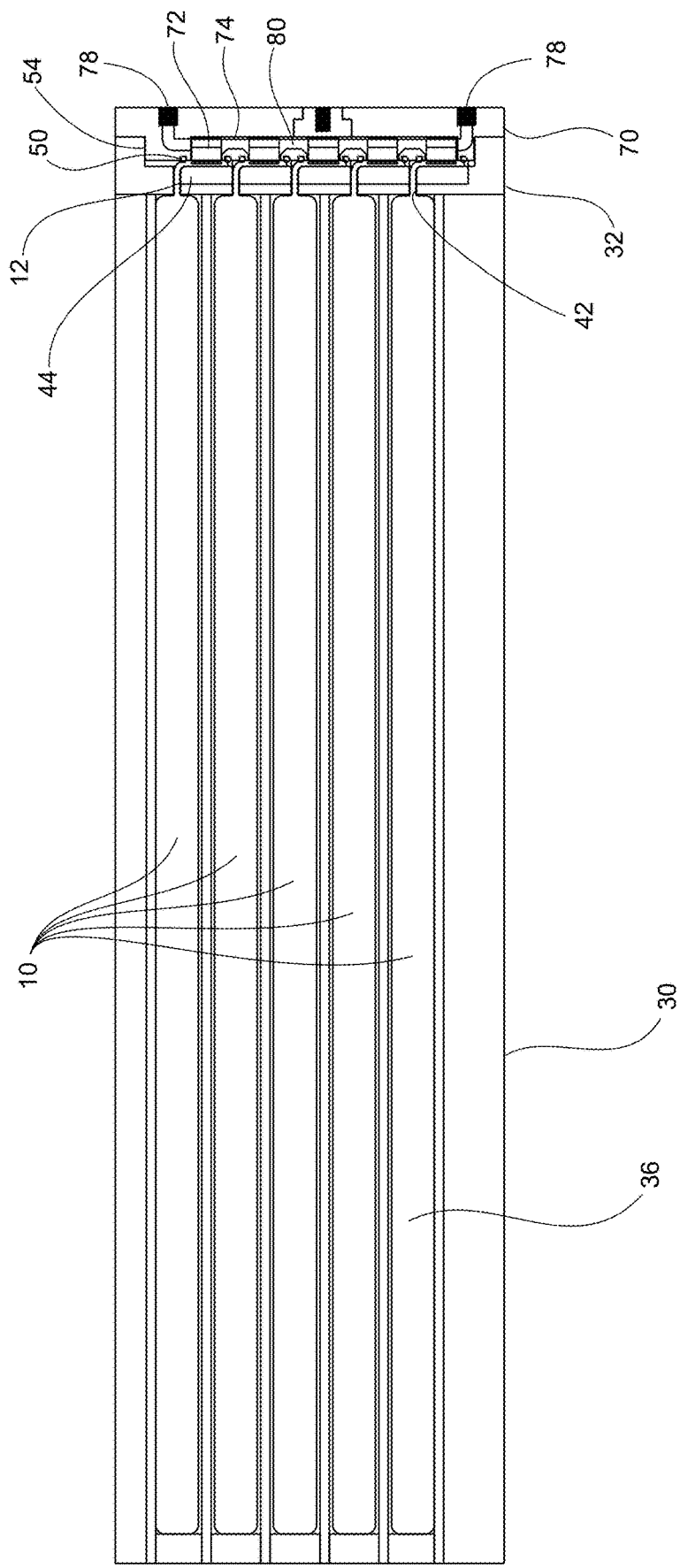
FIG. 12A is a side cross-sectional view of the battery module of FIG. 11A.
Figure 12B:
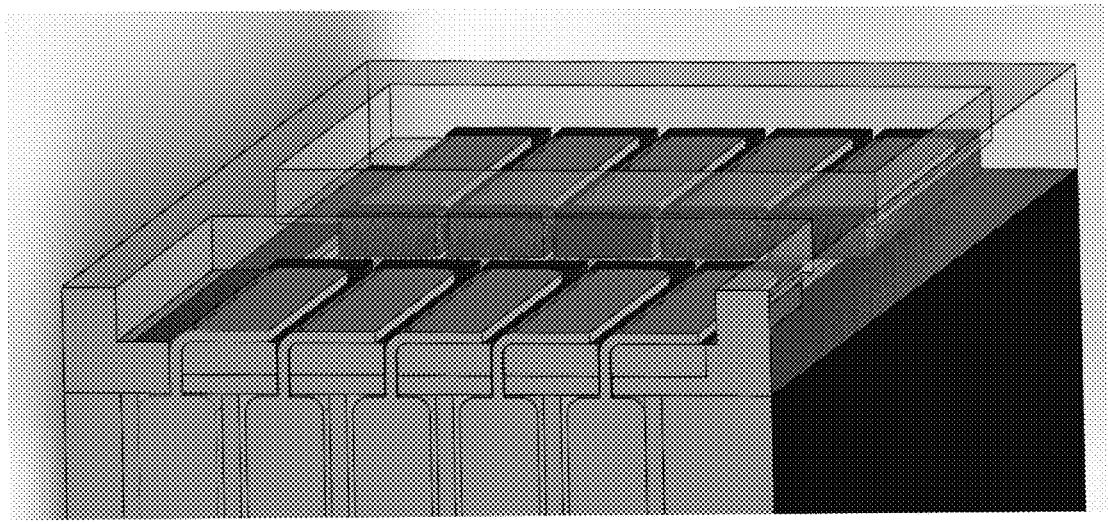
FIG. 12B is a perspective view of the battery module of FIG. 11A with the terminal cover and gasket holder removed.
Figure 12C:
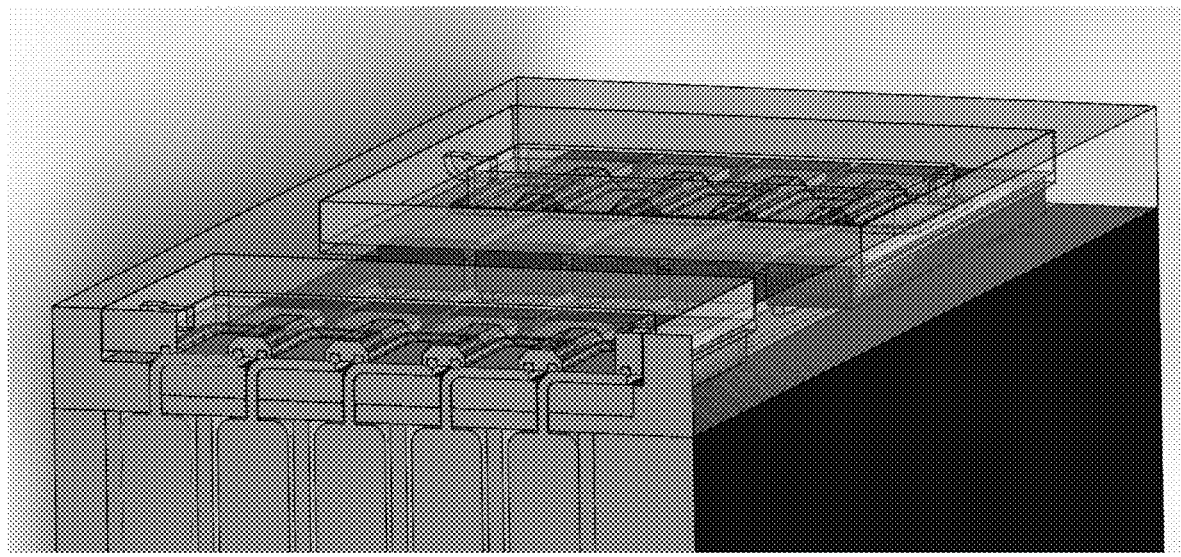
FIG. 12C is a perspective view of the battery module of FIG. 12C with the terminal cover installed.
Figure 12D:
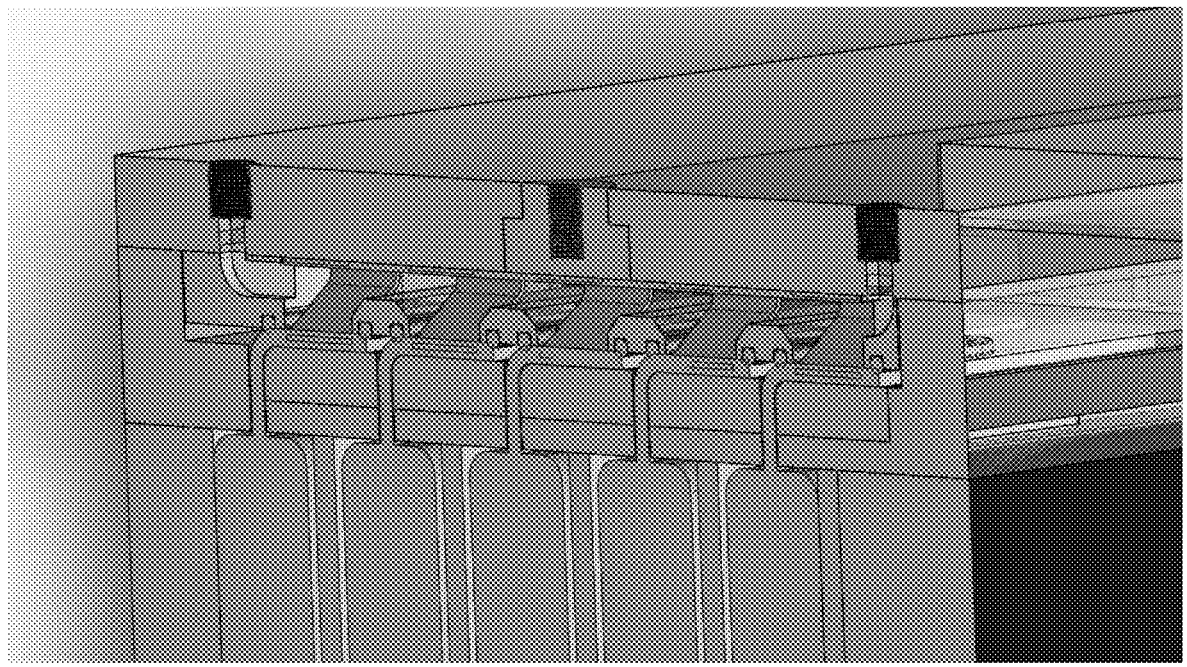
FIG. 12D is a perspective view of the battery module of FIG. 12B with the gasket holder installed.
Figure 13C:
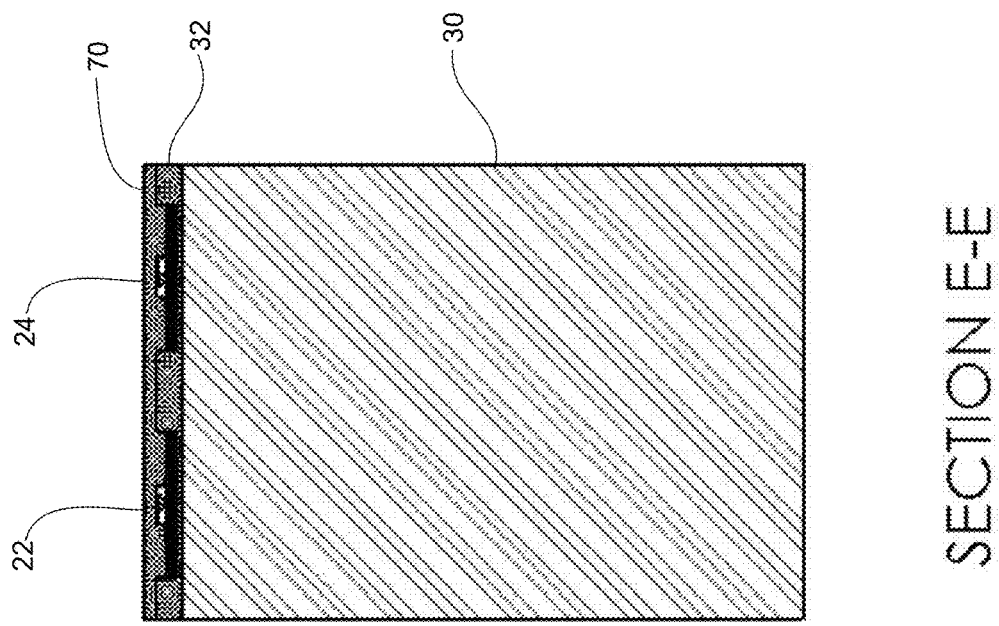
FIG. 13C is a side cross-sectional view of the battery module of FIG. 13B along cutline E.
Figure 13B:
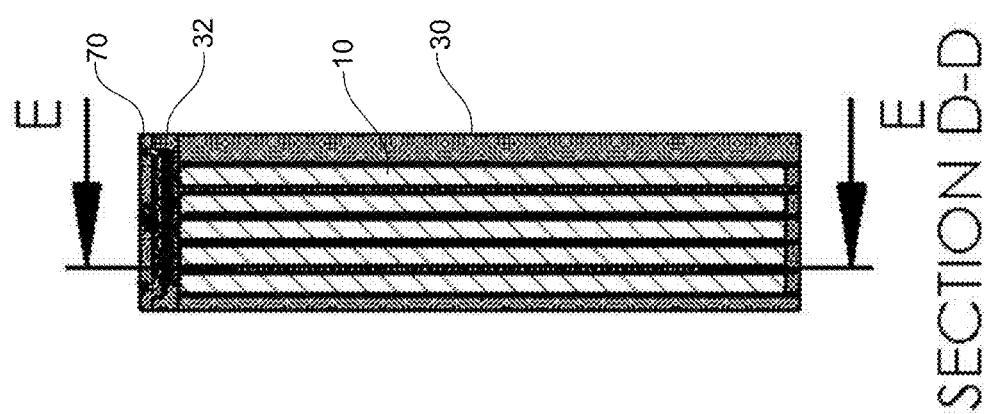
FIG. 13B is a side cross-sectional view of the battery module of FIG. 13A along cutline D.
Figure 13A:
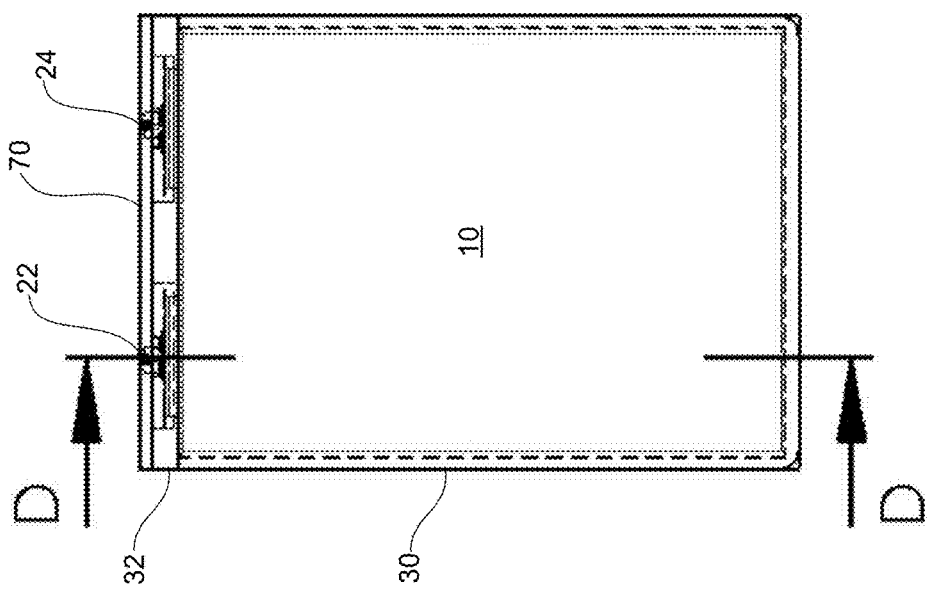
FIG. 13A is a front elevation view of the battery module of FIG. 11A.
Figure 13D:
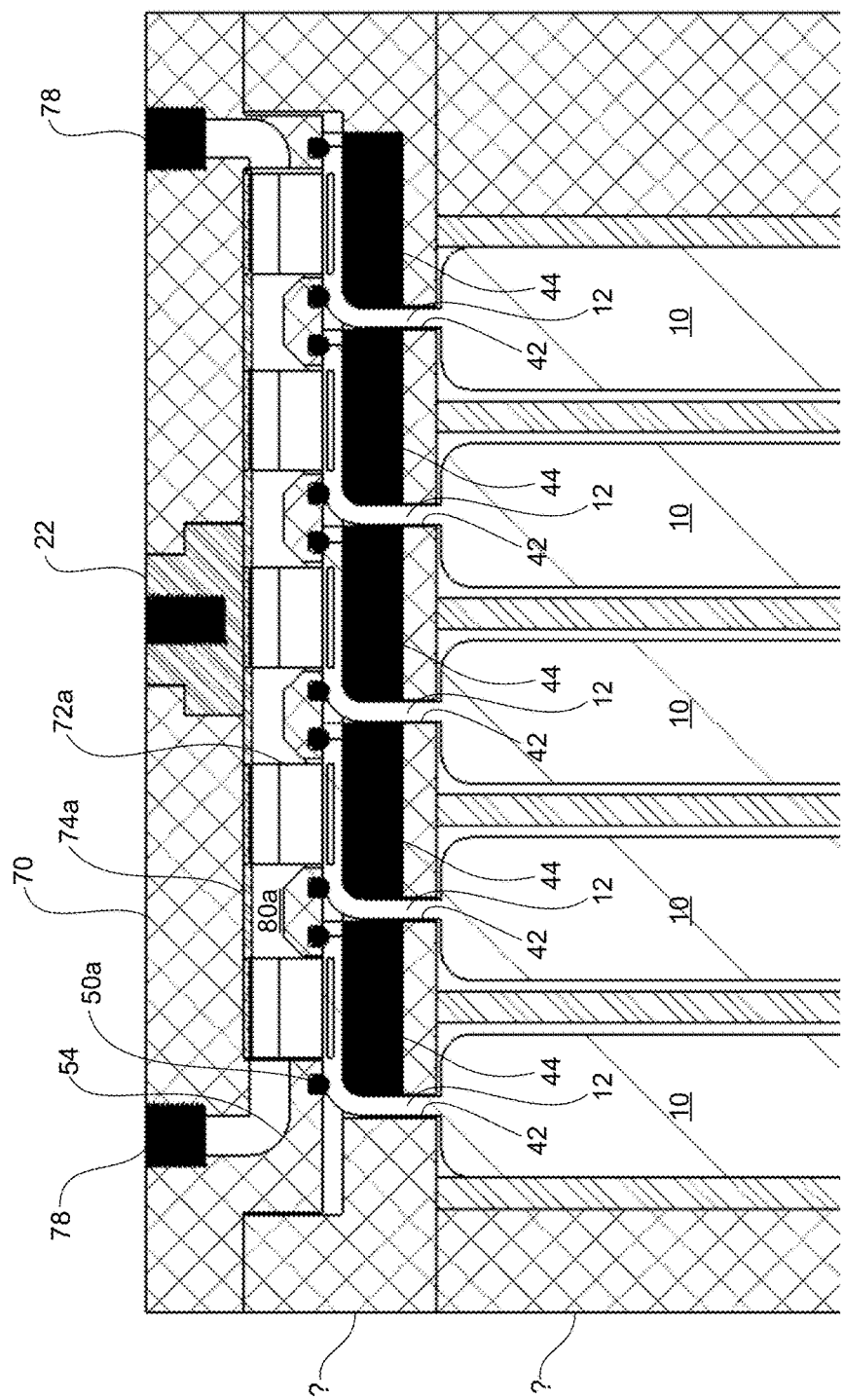
FIG. 13D is a detail view of the battery module of FIG. 13B.
Figure 13E:
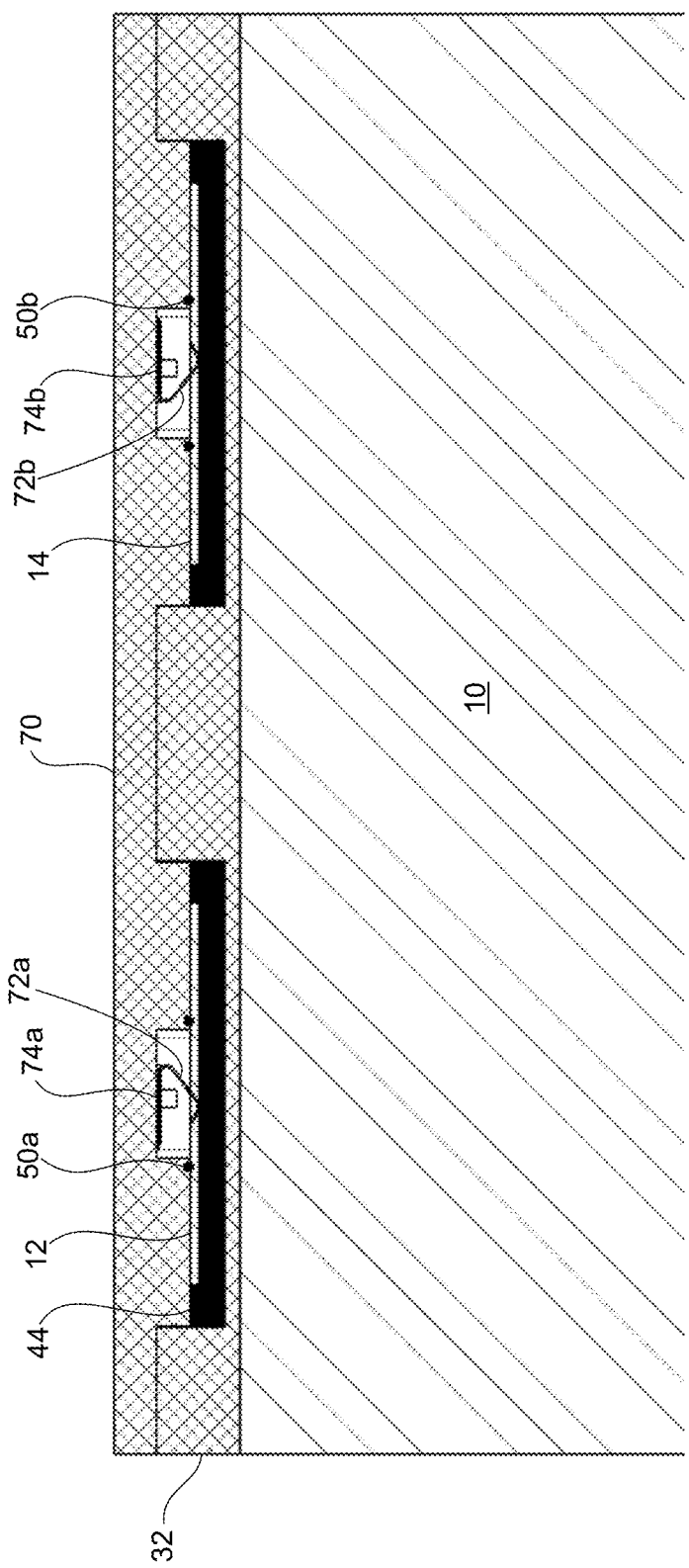
FIG. 13E is a detail view of the battery module of FIG. 13C.

In the embodiments depicted in FIGS. 1 to 6 and FIGS. 17A to 17D, the top and bottom portions 32,34 each comprise a first and second plurality of apertures 42a,42b for receiving the cells 10 therethrough. In other embodiments, such as those wherein the cell terminals 12,14 are both located at one end of the cells 10, the apertures 42 are located at only one of the top portion 32 or bottom portion 34. As shown in FIG. 8, the apertures 42 can be located at the first portion 32 of the housing and receive the entire cell 10 therethrough with both cell terminals 12,14. As shown in FIGS. 11A and 11B, in an embodiment, the first and second apertures 42a,42b are both located at the top portion 32 of the housing 30 and configured to receive cell terminals 12,14.

Optionally, in embodiments, as shown in FIG. 4, the top and bottom portions 32,34 of the module housing 30 may each comprise a circumferential lip 46 in which the gaskets 50 may be seated to isolate the gaskets 50 from the environment when the module 20 is fully assembled.

Figure 3:
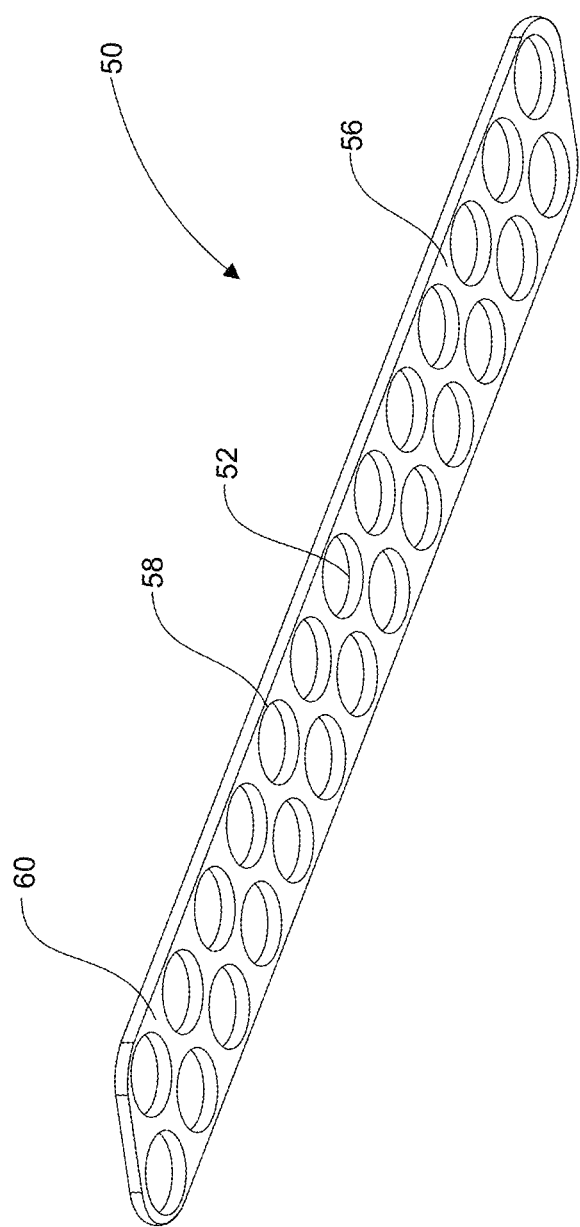
FIG. 3 is a perspective view of an embodiment of a gasket of the battery module of FIG. 1.
Figure 5:
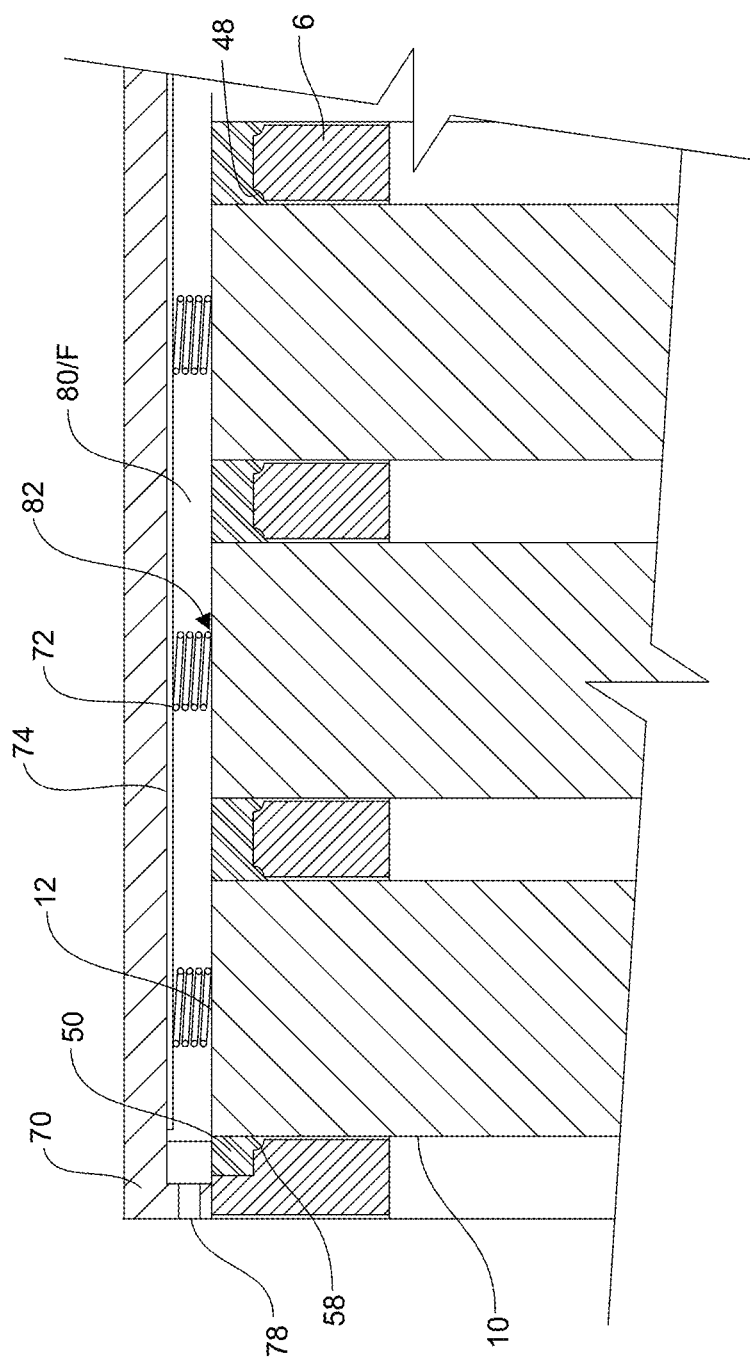
FIG. 5 is a side cross-sectional view of an embodiment of a battery module.
Figure 10:
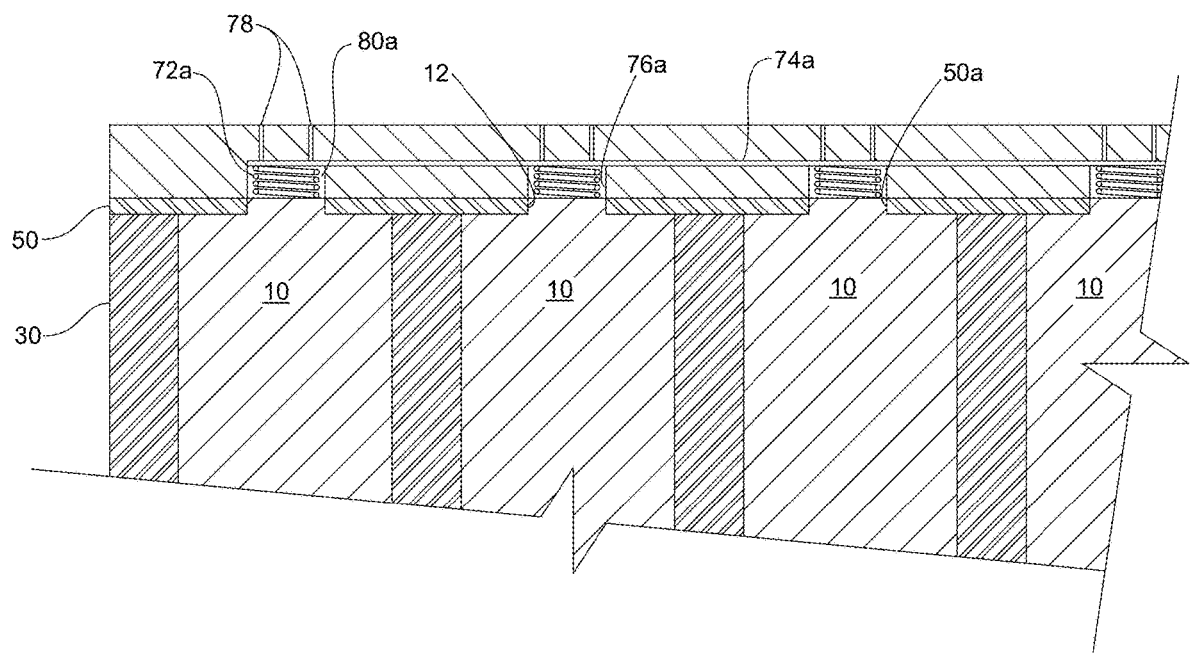
FIG. 10 is a side cross-sectional view of an embodiment of a battery module containing prismatic or fuel cells.

With reference to FIGS. 1, 3, and 5, in an embodiment, first and second gaskets 50a,50b are located at the first and second ends 33,35 of the housing 30 for fluidly sealing the internals of the first and second bulkheads 26,28, respectively. The gaskets 50a,50b have respective first and second pluralities of pass-through openings 52a,52b for receiving and sealing with the cells 10 or the first and second terminals 12,14 of the cells 10. As shown in FIG. 1, in an embodiment, first gasket 50a having the first plurality of openings 52a can be located at the first end 33 of the housing 30, and second gasket 50b having the second plurality of openings 52b can be located at the second end 35. In other embodiments wherein the terminals 12,14 are located at the same end of the cells 10, as shown in FIGS. 8 and 10, a single gasket 50 can be configured to receive and seal with the cells 10 or the first and second cell terminals 12,14. Further, in embodiments and as shown in FIGS. 11A and 11B, individual gaskets 50 can be used to seal with each cell terminal 12,14.

Referring to FIG. 3, an embodiment of the gasket 50 is illustrated. The gasket 50 comprises a flat portion 56 through which the pluralities of openings 52 are formed to receive and seal with cells 10, or the terminals 12,14 thereof, depending on the design of the module 20 and cells 10. The flat portion 56 provides a seal between the housing 30, terminal covers 70, and cells 10/terminals 12,14 to retain fluid within the bulkheads 26,28. In embodiments, the openings 52 are sized to provide a close or interference fit with the cells 10 or terminals 12,14 passing therethrough to effect a sealing engagement therewith. In the embodiment depicted in FIG. 3, the openings 52 are circular to correspond to the cylindrical shape of the cells 10. In the embodiment depicted in FIG. 8, the openings 52 are also circular to correspond to the shape of the terminals 12,14. However, the openings 52 may be provided in any shape suitable to create a sealing engagement with the cells 10 or terminals 12,14. Further, in some embodiments, as best shown in FIG. 5, the openings 52 may each comprise an annular seal, lip, or upstanding portion 58 such as an O-ring to provide additional sealing with the cells 10 or terminals 12,14. Referring still to FIG. 5, in embodiments wherein annular seals 58 are present, the housing 30 may comprise annular grooves or shoulders 48 sized to accommodate the annular seals 58 of the gaskets 50. The annular seals 58 provide a greater sealing area between the gasket 50 and the cells 10 to create a more effective sealing engagement.

In other embodiments, as depicted in FIGS. 11A, 11B, and FIGS. 17A-17C, individual gaskets 50 can be used to seal with the terminals 12,14 of the cells. In the embodiment depicted in FIGS. 11A and 11B, as described in greater detail below, the gaskets 50 seal against the flat terminals 12,14 to create a fluidly sealed reservoir 80 around electrical contacts 72 contacting the terminals 12,14. In embodiments, as shown in FIGS. 11A to 12 and FIGS. 17A to 17D, the bulkhead 26 or bulkheads 26,28 can further comprise one or more gasket holders 54 to retain individual gaskets 50 and position them to seal with cells 10 or the terminals 12,14 thereof. While the individual gaskets 50 depicted in FIGS. 11A, 11B, and 17A to 17D are generally ring-shaped, they can be of any shape suitable for sealing with the cells 10 or the terminals 12,14 thereof.

The gaskets 50 can be composed of any suitable electrically insulating, flexible, resilient material such as neoprene, nitrile rubber, plastics such as PTFE, or any other material that has suitable characteristics for forming a seal with the body 30, cover 70, and cells 10. The gasket material used may also depend on the fluid used in the module 20, for example, neoprene does not perform well in the presence of particular oils. In embodiments wherein connection means 38 such as bolts are used, connection holes 60 can be formed in the gaskets 50 to accommodate the connection means 38.

Figure 2:
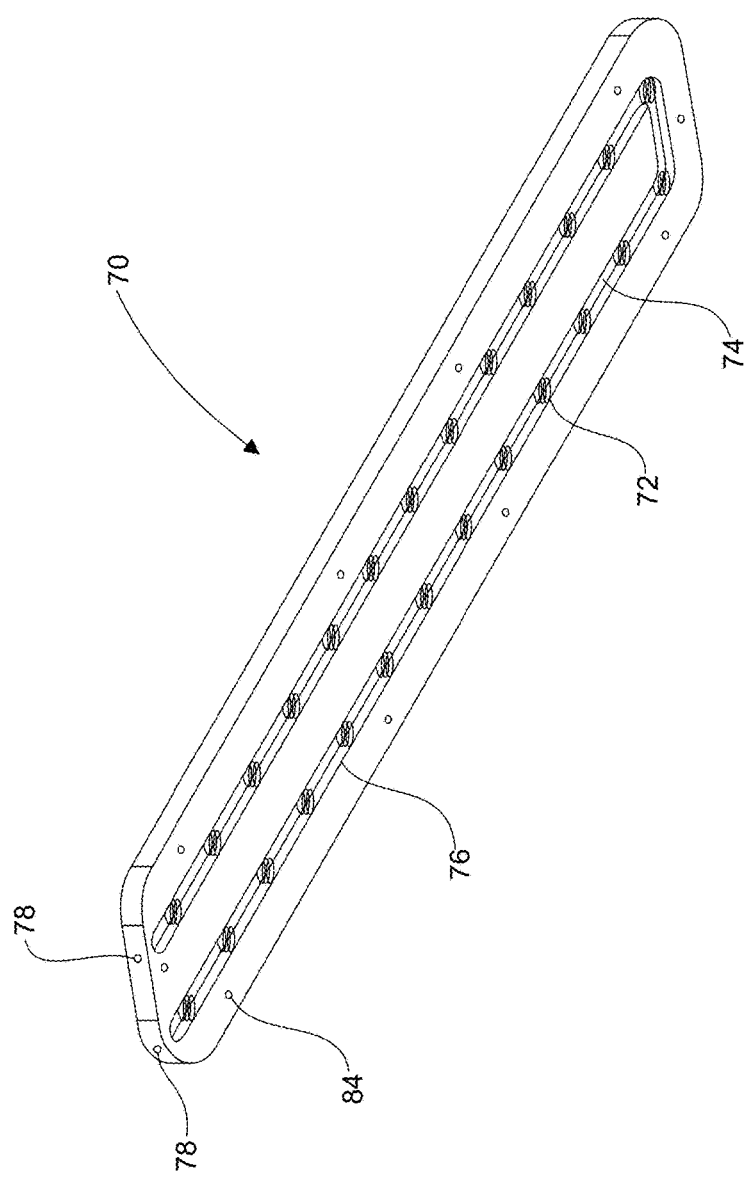
FIG. 2 is a perspective view of an embodiment of a cover of the battery module of FIG. 1.

With reference to FIG. 2, an embodiment of the terminal cover 70 comprises a plurality of conductive contacts 72 configured to contact the terminals of the cells 10, and one or more connective conductors such as conductor bus bars 74 electrically connecting the conductive contacts 72. The terminal cover 70 can comprise one or both of the module terminals 22,24, which are electrically connected to the conductor buses 74 depending on the configuration of the module 20, such as whether the module 20 houses cylindrical or prismatic cells 10, and whether the cells 10 are connected in parallel or series. In the depicted embodiment in FIG. 2, the terminal cover 70 comprises a single conductor bus 74 connecting all of the contacts 72, such as for use with a module 20 to connect the cells 10 in parallel. The terminal cover 70 further comprises one or more cavities or channels 76 formed therein, in which the conductive contacts 72 and conductor bus 74 are located. In embodiments, the cavities/channels 76 are formed through the gasket holders 54, which are configured to couple with the terminal cover 70 such that the conductive contacts 72 thereof are located within the cavities/channels 76. In embodiments, the gasket holders 54 can be formed integrally with the terminal cover 70.

In some embodiments, fluid ports 78 are formed in the cover 70 and are in communication with the channel 76 so as to permit more convenient introduction of fluid F into, and/or removal of fluid from, the channel 76. The fluid ports 78 can be configured to receive fittings, valves, and/or tubing to introduce or remove fluid F. The ports 78 can also be configured to receive pins or plugs to prevent fluid communication therethrough. In embodiments, the fluid ports 78 can be formed in the body 30 and configured to provide fluid communication with the channel 76 when the module 20 is assembled. It may be desirable to place two ports 78 per cavity/channel 76, as shown in FIGS. 2, 8, 10, 8, 10, 11A to 12A, 12D, 17A, and 17D such that one port 78 serves as a fluid inlet port and the serves as an egress port for permitting fluid to exit the channel 76 as fluid is injected via the inlet port. In embodiments, the module 20 does not have any fluid ports 78 and the fluid F is instead applied or pre-filled in the cavities/channels 76 or reservoirs 80.

In embodiments wherein a connection means 38 such as bolts are used, a plurality of cover connection holes 84 may be formed through the covers 70 corresponding to the respective connection holes 60,39 of the gasket 50 and body 30.

The conductive contacts 72 are configured to provide a non-permanent engagement with the terminals 12,14 of the cells 10. The conductive contacts 72 are illustrated as coil springs in FIGS. 1 to 10, and as leaf springs in FIGS. 11A to 13E and FIGS. 17A to 17D, but may also be flat plates or any other suitable structure for providing a non-permanent engagement with the cells 10.

When the cover 70 is secured to the housing 30 with gasket(s) 50 therebetween, the channel 76 cooperates with the gasket(s) 50 and body 30 to form a one or more fluid reservoirs 80 that encompass at least the contacts 72 while they engage the terminals 12,14.

With reference to FIGS. 1 to 6, in an exemplary embodiment for housing and connecting a plurality of cylindrical cells 10 in parallel, a plurality of cells are retained in housing 30 such that all of their terminals 12,14 are oriented in the same direction. A first terminal cover 70a is connected to the first portion 32 of the housing 30 with a first gasket 50a therebetween such that the first apertures 42a of the body 30, first openings 52a of the first gasket 50a, and first contacts 72a of the first cover 70a are all aligned. The first terminal cover 70a, first gasket 50a, and first portion 32 cooperate to form a first fluid reservoir 80a encompassing the first terminals 12 of the cells 10, and the first contacts 72a of the first cover 70a contact the first cell terminals 12. Likewise, a second terminal cover 70a is connected to the second portion 34 of the housing 30 with a second gasket 50b therebetween to form a second fluid reservoir 80b encompassing the second terminals 14 of the cells 10, and the second contacts 72b of the second cover 70b contact the second cell terminals 14. The first terminal 22 of the module 20 is located on the first terminal cover 70a and electrically connected to the first conductor bus 74a, which is in turn connected to all of the first contacts 72a. Likewise, second terminal 24 is located on the second terminal cover 70b and electrically connected to the second conductor bus 74b, which is connected to all of the second contacts 72b. In this manner, all of the cells 10 of the modules 20 are connected in parallel. The terminal covers 70a,70b retain and protect the internal components of the module 20 while fluid communication with the reservoirs 80a,80b is permitted through the ports 78.

With reference to FIGS. 17A to 17D, in another embodiment, two rows of cells 10 are oriented in the housing 30 such that a first row 11a of cells 10 has its terminals 12,14 oriented in a first direction, and a second row 11b of cells 10 has its terminals 12,14 oriented in a second direction opposite the first direction. A plurality of individual gaskets 50 corresponding to each cell terminal 12,14 are retained on gasket holders 54,54, which are in turn coupled to the first and second portions 32,34 of the housing 30. The gasket holders 54,54 have first and second cavities 76a,76b formed therein for defining the first and second fluid reservoirs 80a,80b encompassing the first and second electrical contacts 72a,72b of their respective terminal covers. First and second terminal covers 70a,70b are also coupled to the first and second housing portions 32,34 such that the gasket holders 54,54 are sandwiched between the terminal covers 70a,70b and the housing 30. A first conductor bus 74a can be located on the first terminal cover 70a to interconnect first contacts 72a of the first cover 70a. The first contacts 71 of the first cover 70a are configured to contact the first terminals 12 of the cells 10 of the first row 11a. A second conductor bus 74b can be located on the first terminal cover 70a to interconnect second contacts 72b of the first cover 70a. The second contacts 72b of the first cover 70a are configured to contact the second terminals 14 of the cells 10 of the second row 11b. The second terminal cover 70b has a first conductor bus 74a to interconnect the first contacts 72a of the second cover 70b, which are in contact with the first terminals 12 of the cells 10 of the second row 11b, and a second conductor bus 74b to interconnect the second contacts 72b of the second cover 70b, which are in contact with the second terminals 14 of the cells 10 of the first row 11a. The first and second conductor buses 74a,74b of the second terminal cover 70b are electrically connected such that the first row of cells 11a and the second row of cells 11b are connected in series, while the individual cells 10 of each row are connected in parallel with the other cells 10 in the same row. First and second module contacts 22,24 can be located on the first terminal cover 70a and respectively connected to the first and second conductor buses 74a,74b of the first cover 70a.

Figure 9:
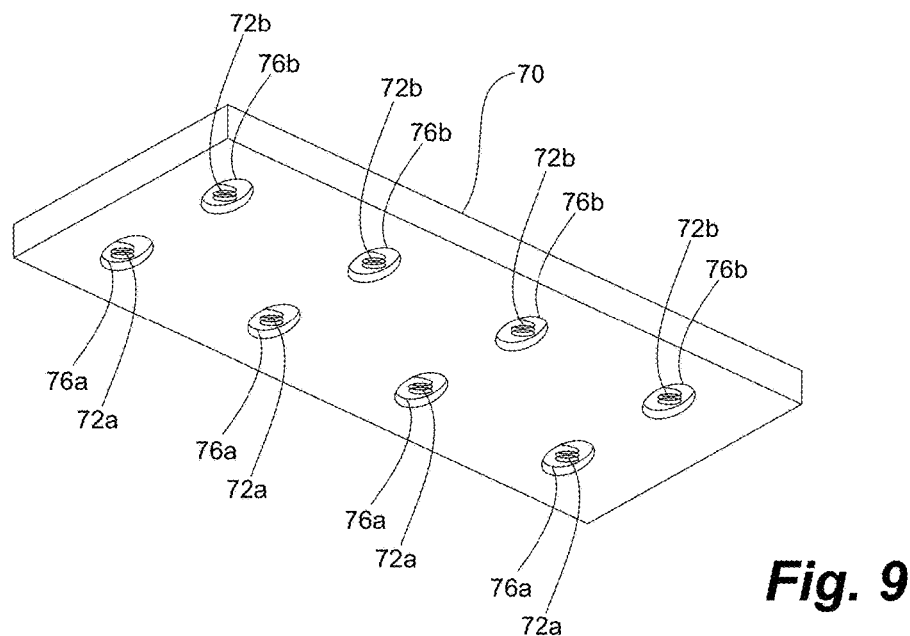
FIG. 9 is a perspective view of an embodiment of a cover of the battery module of FIG. 8.

With reference to FIGS. 8-10, in an embodiment of a module 20 for housing and connecting in parallel cells 10 having first and second terminals 12,14 located at the same end, such as for prismatic or fuel cells, a single cover 70 comprises a plurality of first cavities 76a each having a first contact 72a located therein, and a plurality of second cavities 76b each having a second contact 72b located therein. First and second conductor bus bars 74a,74b are located in the cover 70 and electrically connect all of the first and second contacts 72a,72b, respectively. Module terminals 22,24 are in turn respectively connected to the conductor buses 74a,74b. The cover 70 can be secured to the body 30 with a gasket 50 located therebetween, the cover 70, gasket 50, and body 30 cooperating to define a plurality of first fluid reservoirs 80a and a plurality of second fluid reservoirs 80b. The gasket 50 has both the first and second openings 52a,52b formed therethrough and configured to seal with the first and second cell terminals 12,14, respectively.

With reference to FIGS. 11A-13E, in another embodiment, a module 20 for housing and connecting in parallel prismatic cells 10 or other cells with their terminals 12,14 located at the same end is provided. The module 20 comprises a removable first housing portion 32 having a plurality of slot-shaped apertures 42 for receiving the terminals 12,14 of the cells 10 therethrough. In the depicted embodiment, the terminals 12,14 are flat tabs that are capable of being bent. In embodiments, the removable first housing portion 32 can be configured to receive terminal seats 44 for the terminals 12,14 to be bent thereover, as best shown in FIGS. 12 and 13D. For example, the first housing portion 32 has recesses in which the seal seats 44 may be inserted such that they are positioned adjacent their respective slots 42. In other embodiments, the terminals 12,14 can be bent over the first housing portion 32 itself. In embodiments, terminal seats 44 can be made of a resilient material, such as the same material as the gaskets 50, for sealing with a first side of the terminals 12.14. One or more gasket holders 54 can be used to retain and position individual gaskets 50, depicted here as generally ring-shaped, in alignment with the terminals 12,14. The gasket holders 54 have one or more seal seats on a bottom face thereof to receive the gaskets 50. Further, cavities 76 are formed in the gasket holders 54 for receiving the electrical contacts 72 of the terminal cover 70 therethrough. As above, the terminal cover 70 has first and second outer terminals 22,24 electrically connected to corresponding conductor busses 74, which are in turn connected to conductive contacts 72 configured to maintain contact with the terminals 12,14 of the cells. As shown in FIGS. 11A-13E, a first conductor bus 74a is connected to a plurality of first conductive contacts 72a, which in turn extend through first cavities 76a of a first gasket holder 54a to make contact with the first cell terminals 12. A second conductor bus 74b is connected to a plurality of second conductive contacts 72b, which extend through second cavities 76b of a second gasket holder 54b to make contact with the second cell terminals 14. While two gasket holders 54a,54b are shown in the figures, in other embodiments, a single gasket holder 54 may be used to retain all of the gaskets 50. In other embodiments, the gasket holder(s) 54 are integral with the cover 70. As best shown in FIGS. 11B, 12, and 13D, the gasket holders 54a,54b have respective cavities 76a,76b. When the module 20 is fully assembled, the top portion 32, terminal seats 44, gaskets 50, gasket holders 54a,54b, and terminal cover 70 define first and second fluid reservoirs 80a,80b encompassing the first and second conductive contacts 72a,72b respectively.

The fluid reservoirs 80a,80b are filled with an inert fluid F, such as through ports 78 or direct application. The fluid F can be a gas or liquid, or another suitable substance for dampening the forces experienced by the cells 10, such as grease. In embodiments, such as when a conductive fluid F is used, the first and second fluid reservoirs 80a,80b are fluidly isolated from each other to avoid short circuits.

Figure 17A:
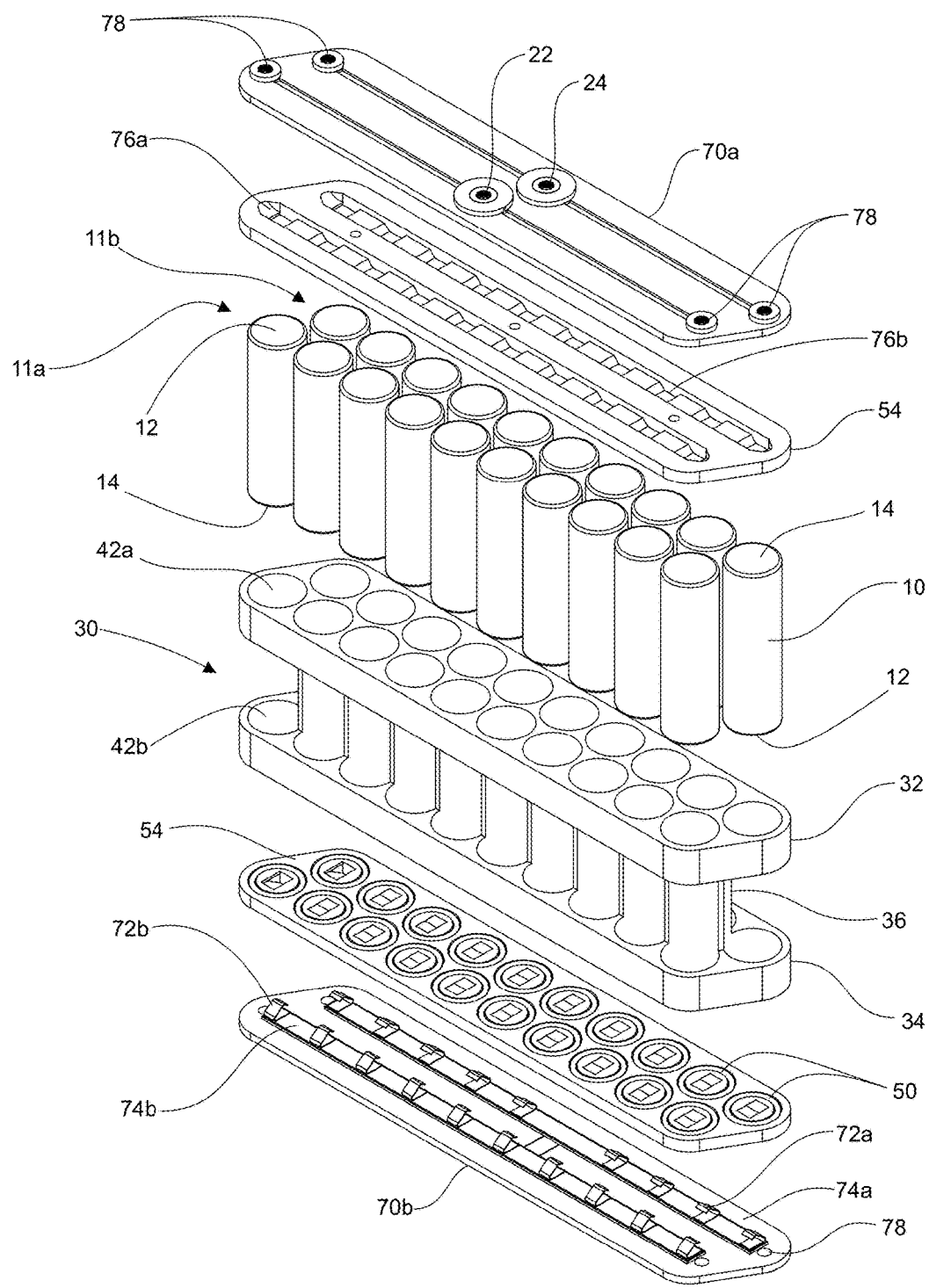
FIG. 17A is an exploded perspective view of an embodiment of a battery module containing cylindrical cells and having a gasket holder.
Figure 17B:
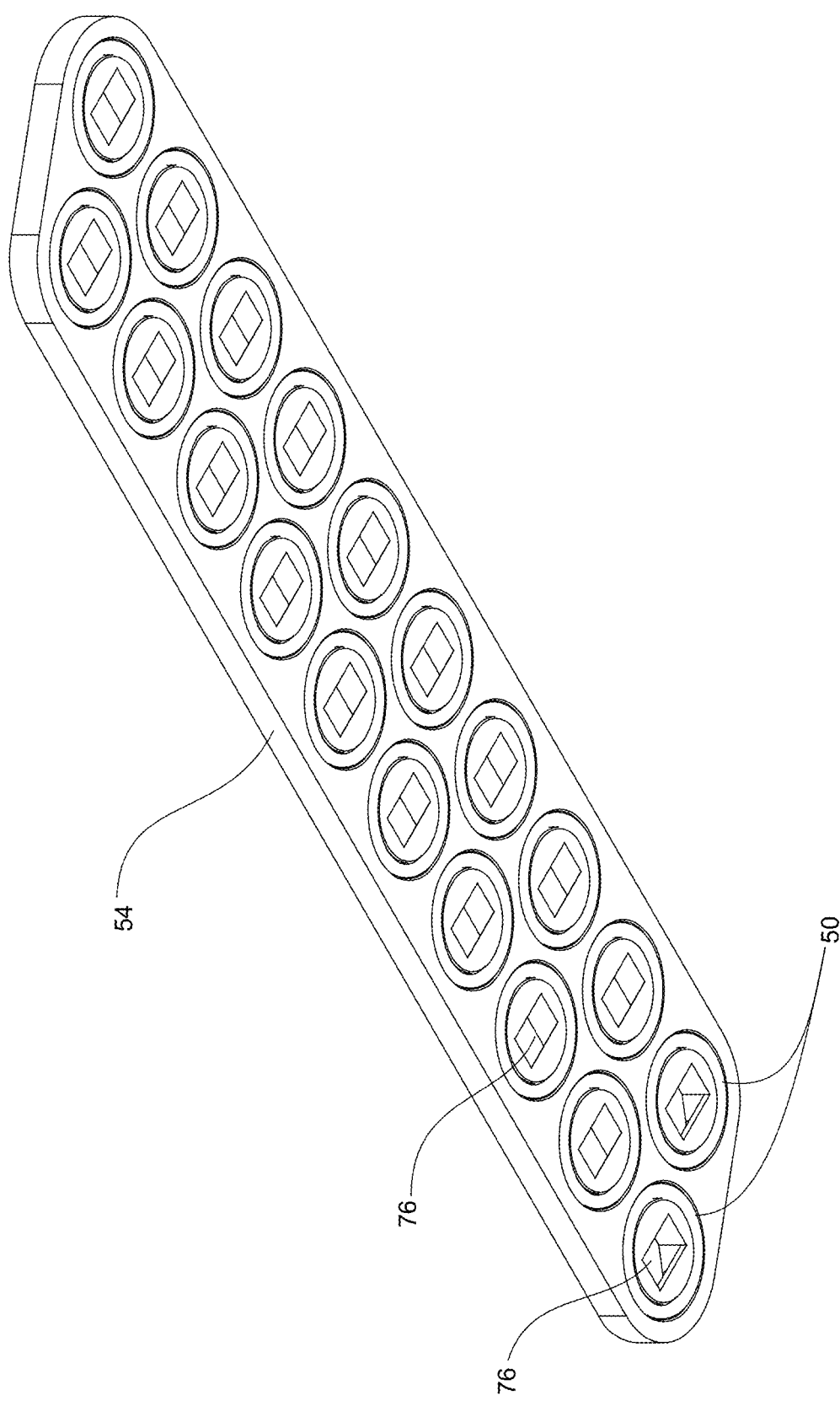
FIG. 17B is a top perspective view of the gasket holder of FIG. 17A.
Figure 17C:
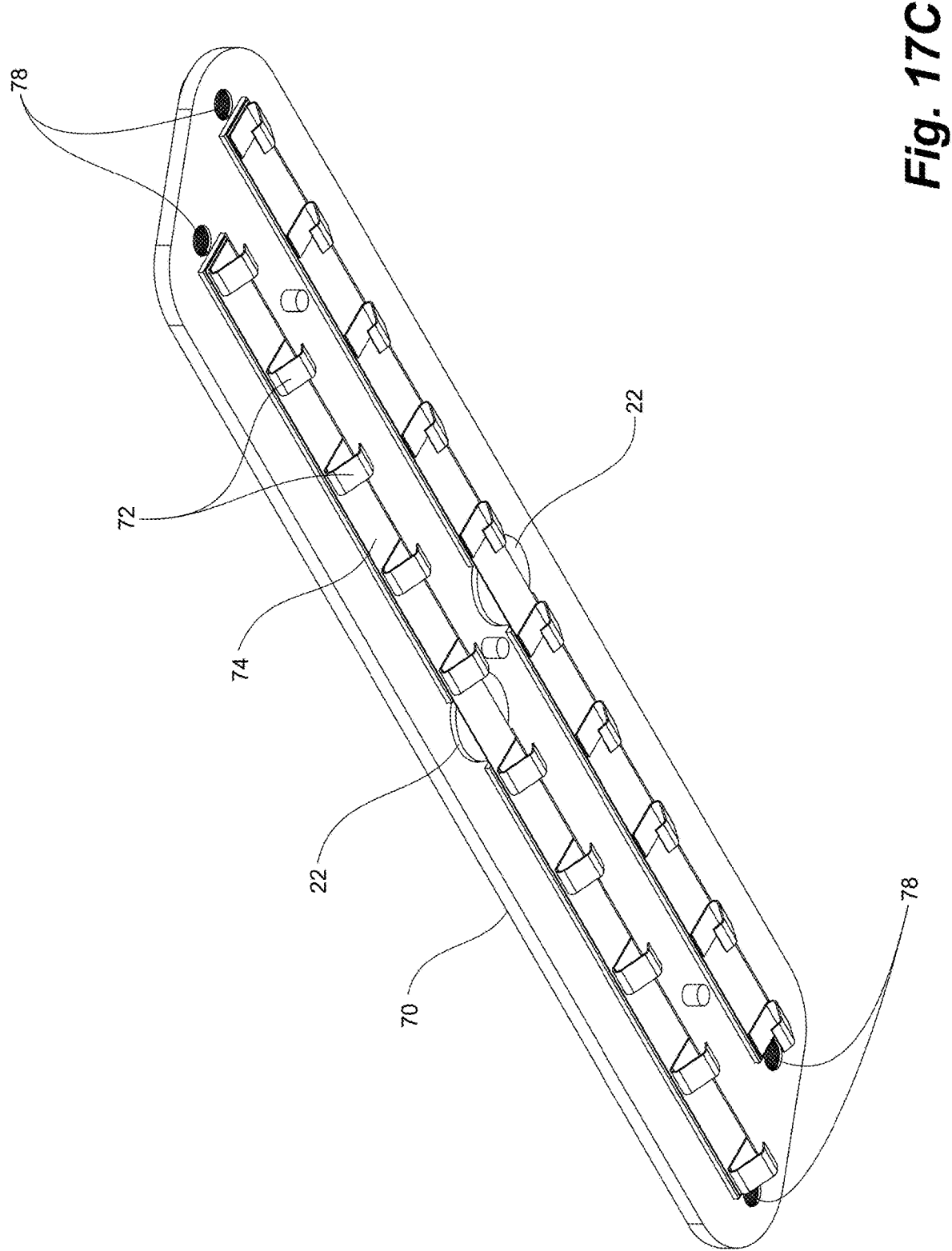
FIG. 17C is a bottom perspective view of the gasket holder of FIG. 17A.
Figure 17D:
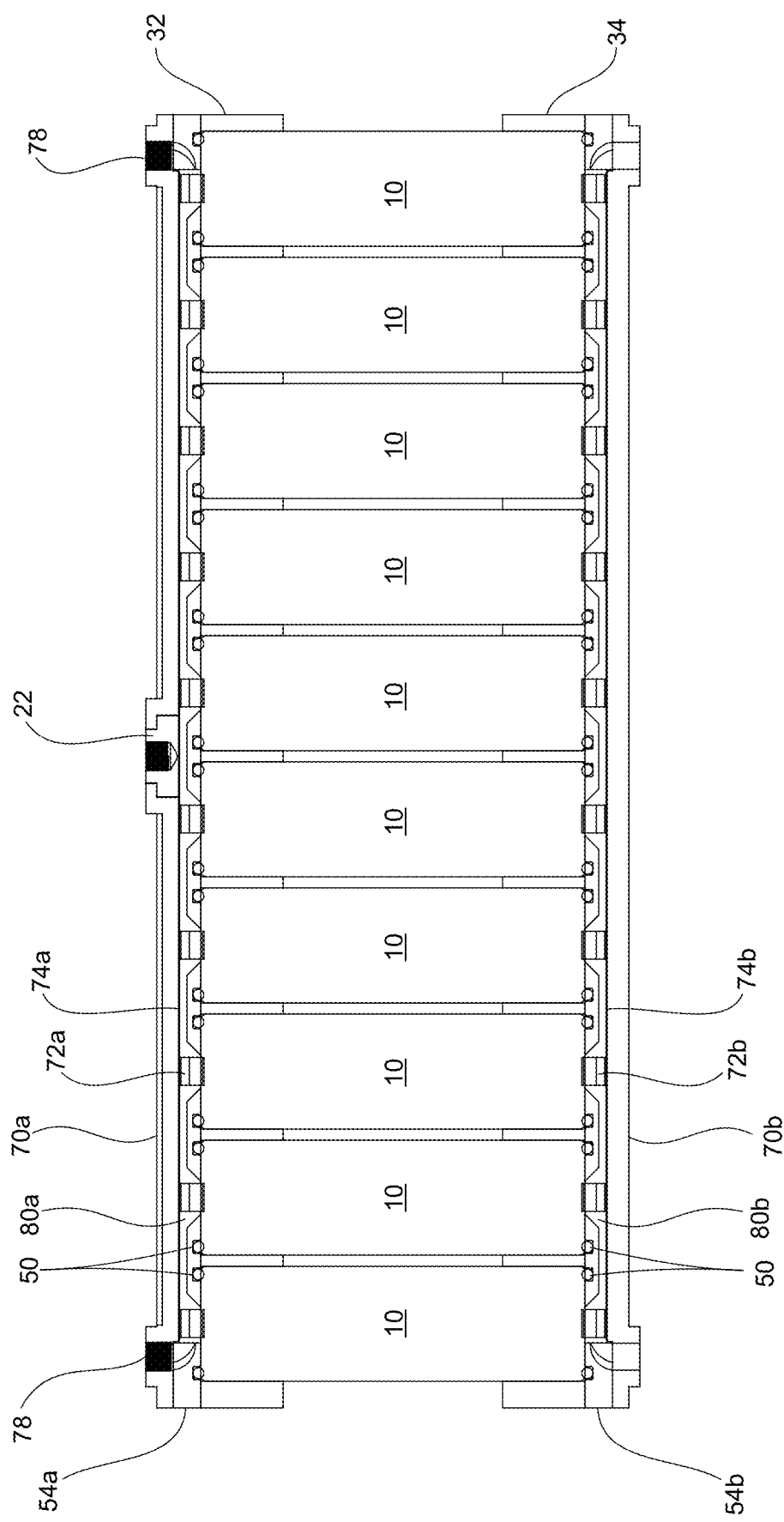
FIG. 17D is a side cross-sectional view of the battery module of FIG. 17A.

With reference to FIGS. 5 and 17D, once the module 20 is fully assembled, a point of contact 82 between the conductive contacts 72 and the cells 10 within the fluid-filled reservoir 80 is illustrated. While FIG. 5 depicts the contact between the first conductive contacts 72a and the first cell terminals 12, it is also illustrative of the contact between the second conductive contacts 72b and the second cell terminals 14. At the point of contact 82, the displacement of air by the fluid F in the reservoir 80 protects the terminals 12,14 of the cell 10 and the conductive contact 72 against oxidation and corrosion, as it reduces the exposure of the conductor 72 and terminal 12,14 to air while electric current is passing therethrough. Possible combustion of any leaked contents of the cell 10 into the reservoir 80 is also prevented due to the absence of oxygen, the air in the reservoir 80 having been displaced by the fluid F. The contacts 72 are also less likely to lose electrical contact with the cells 10 due to vibrations, as the fluid F in the reservoir 80 dampens the forces experienced by the cells 10. Further, in some embodiments, the fluid F contained in the reservoir 80 can be selected to neutralize, dilute, or isolate fluids that can potentially leak from faulty cells 10 or other contaminants that may enter the reservoir 80. For example, nitrogen or a weak base can be selected to neutralize lithium hexafluorophosphate (an electrolyte) leaking from a lithium-ion battery cell 10. Selecting a weak basic fluid serves to neutralize such a leaking electrolyte without a great exothermic effect, reducing the likelihood of combustion.

Referring to FIG. 6, an embodiment of a fully assembled module 20 is illustrated wherein the first and second terminal covers 70a,70b are installed onto the top and bottom portions 32,34 of the housing 30. In this embodiment, twenty-six (26) cells 10 are securely held in place and connected in parallel with their terminals 12,14 sealed inside the first and second bulkheads 26,28 and their sides exposed. In other embodiments, the cells 10 may also be enclosed within the columns 40 of the body 30 or otherwise isolated from the outside environment. The first and second terminal covers 70a,70b are installed using suitable connection means 38, in this case fastening bolts extending through the connection holes 39,60,84 of the body 30, gaskets 50a,50b, and covers 70a,70b, respectively, to compress the first and second gaskets 50a,50b between the housing 30 and covers 70a,70b. Compression of the gaskets 50a,50b between the housing 50 and covers 70a,70b causes the gaskets 50a,50b to seal against the bodies of the cells 10 extending therethrough, thus preventing fluid from escaping out of the first and second fluid reservoirs 80a,80b. The fluid access ports 78 of the terminal covers 70a,70b provide access to the first and second fluid reservoirs 80a,80b. As discussed above, the fluid access ports 78 may be located at any appropriate location, and can also be located on the housing 30.

The fluid F can be any appropriate inert fluid and can be selected based on cost and the intended operating environment of the module 20. A person of skill would understand that characteristics of an appropriate fluid F may include non-reactive and non-corrosive fluids, fluids operational through the intended operating temperature range of the selected cells 10 (e.g. lithium cells typically have an operating range from approximately −10 degrees Celsius to 60 degrees Celsius and an example of a suitable fluid for such cells would have an operating range from approximately −20 degrees Celsius to 100 degrees Celsius), fluids having high viscosity, such as oils and greases, to more effectively create a dampening force to reduce temporary disconnections resulting from extreme momentary forces, fluids that are electrically conductive to help create a better electrical connection at the points of contact 82, and fluids suitable for removing or neutralizing contaminants and corrosive fluids to reduce the risk of combustion with oxygen if one of the cells 10 were to rupture. Examples of suitable fluids F include conductive carbon grease, mineral oil, and nitrogen. The viscosity of the fluid F can also be selected to achieve the desired dampening effect. For example, in applications where vibrations are a greater concern, such as in electric vehicles, a more viscous fluid F may be desirable to mitigate the effects of road vibrations on the electrical connections with the cells 10.

While the depicted embodiments show a single fluid reservoir 80a encompassing all of the first terminals 12 of the cells 10 and a single fluid reservoir 80b encompassing all of the second terminals 14, in other embodiments the cavities 76 of the terminal covers 70 can be configured to form individual fluidly isolated fluid reservoirs 80 that encompass each cell terminal 12,14. Further, in such embodiments, the terminal covers 70 can have sealable hatches that provide access to each individual cell terminal 12,14 for removal and replacement of the cell 10 therein. Ports 78 can be provided for each individual fluid reservoir 80 for introduction of fluid F into, and removal of fluid F from, individual reservoirs 80.

While in the depicted embodiments a single gasket 50 is used to create a seal between the cells 10, terminal covers 70, and body 30, in some embodiments multiple gaskets 50 can be used, for example a single gasket 50 for each electrical contact 72, as shown in FIGS. 11A, 11B, and 17A to 17D. In some embodiments, each electrical contact 72 is encompassed by an individual fluid reservoir 80 and a respective gasket 50 is used to seal each individual reservoir 80.

Figure 15A:
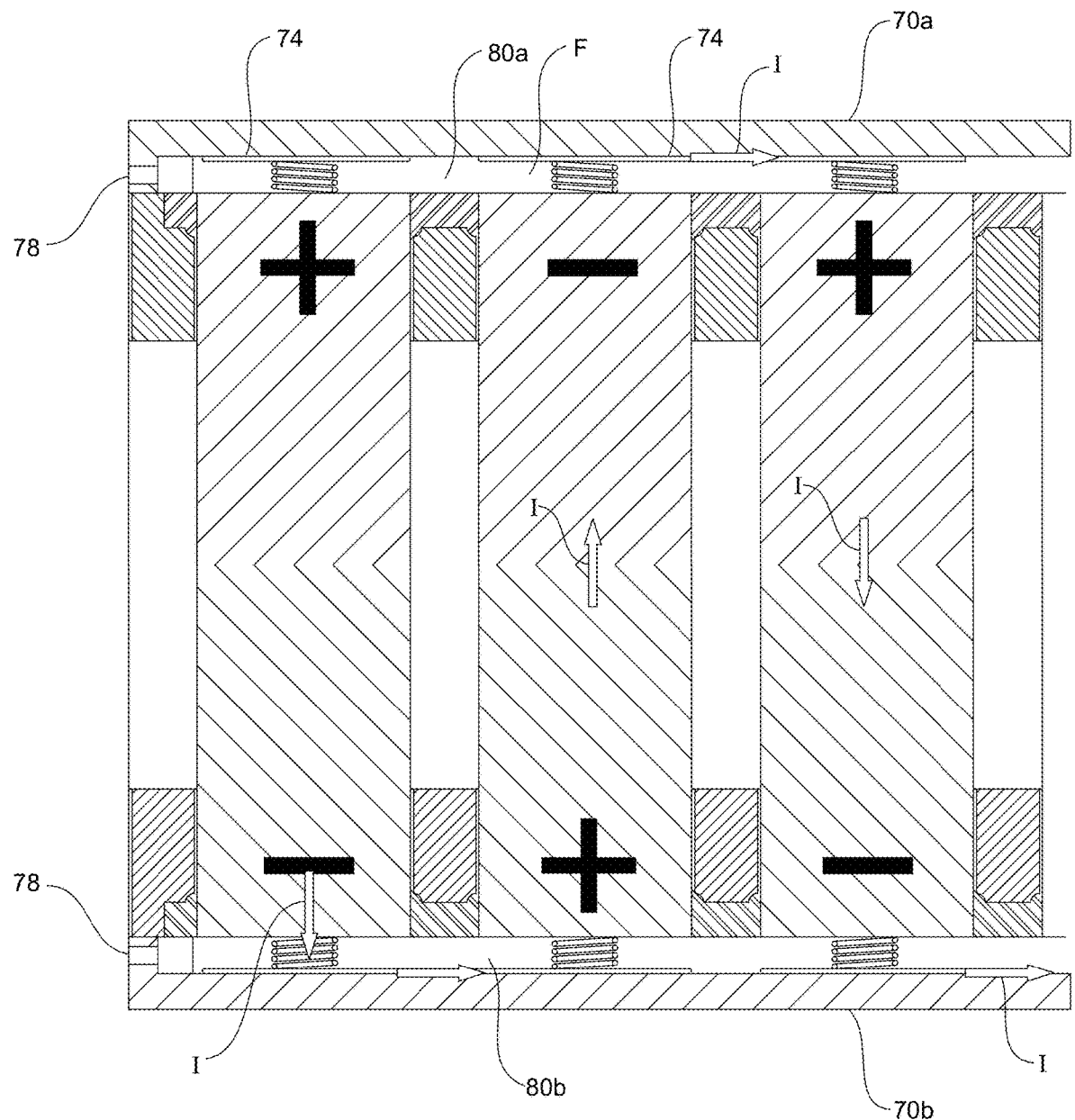
FIG. 15A is a side section view of an embodiment of a battery module containing cylindrical cells connected in series.
Figure 15B:
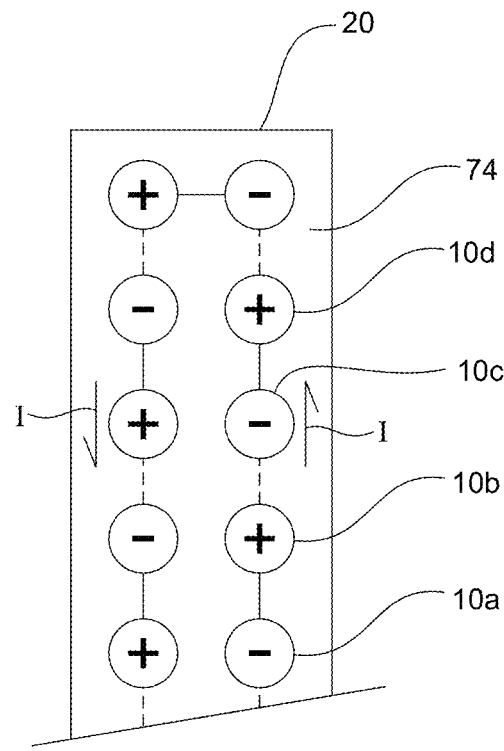
FIG. 15B is a schematic representation of an embodiment of the battery module of FIG. 12A.
Figure 16:
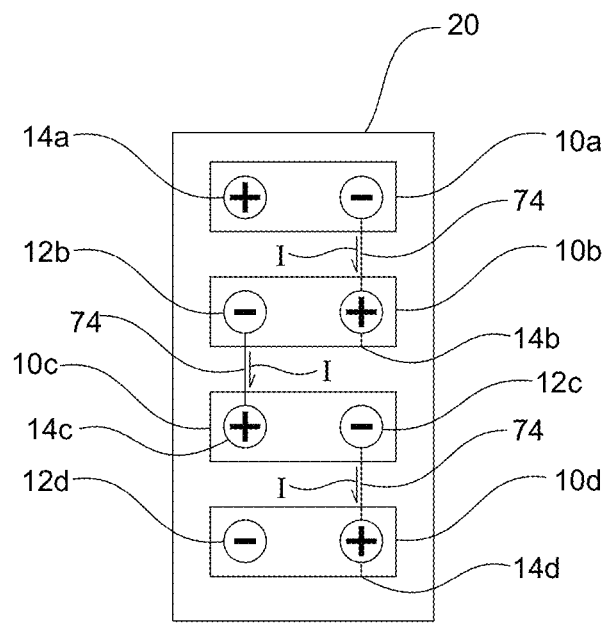
FIG. 16 is a schematic representation of an embodiment of a battery module containing prismatic or fuel cells connected in series.

Additionally, while the embodiments of FIGS. 1-13E depict the cells 10 being connected in parallel via the conductors 74, in other embodiments one or more of the cells 10 can be connected in series. In such embodiments, the conductor buses 74 can be configured to facilitate connection of the cells 10 in series. For example, as shown in FIGS. 15A to 16, the cells 10 can be positioned in the housing 30 with alternating polarity. A plurality of conductor buses 74 can be used to connect contacts 72 engaging the first terminal 12 of a cell 10 to the contacts 72 engaging the second terminal 14 of an adjacent cell 10 such that some or all of the cells 10 of the module 20 are connected in series.

Method of Assembly and Replacement

In one method 100 for assembling a battery module 20 of cylindrical cells 10, with reference to FIG. 11 at step 102, the appropriate number of cells 10 are inserted into the housing 30, such that the first cell terminals 12 extend through the first apertures 42a and the second cell terminals 14 extend through the second apertures 42b. At step 104, the first and second gaskets 50a,50b are then positioned in the first and second portions 32,34 of the housing 30 such that the first and second openings 52a,52b thereof are aligned with the first and second apertures 42a,42b and the cells 10 extend therethrough. In embodiments using gasket holders 54 for retaining a plurality of individual gaskets, the individual gaskets 50a,50b are positioned on their corresponding gasket holders 54 and the gasket holders 54 are aligned with the first and second portions 32,34 of the housing 30 such that the individual gaskets 50a,50b are aligned with the first and second apertures 42a,42b. At optional step 105, in embodiments, fluid F can first be applied to the cavities 76a,76b of the terminal covers 70a,70b and cell terminals 12,14. For example, a viscous fluid such as dielectric grease can be applied. At step 106, the first and second terminal covers 70a,70b are then positioned over the gaskets 50a,50b and secured to the first and second portions 32,34 of the housing 30 respectively using connection means 38 to form the first and second bulkheads 26a,26b. The connection means 38 are be manipulated to provide adequate compressive force between the terminal covers 70a,70b and the housing 30 to establish and maintain electrical contact between the cells 10 and conductive contacts 72a,72b of the terminal covers 70a,70b and compress the gaskets 50a,50b such that they seal against the cells 10 or cell terminals 12,14, housing 30, and terminal covers 70a,70b, thus forming the fluid reservoirs 80a,80b encompassing the cell terminals 12,14 and points of contact 82. At step 108, if fluid ports 78 are present, fluid F can then be introduced into the fluid reservoirs 80a,80b via fluid ports 78 of the terminal covers 70a,70b or housing 30 such that the reservoirs 80a,80b are filled with fluid F and undesirable fluids, such as ambient air, are evacuated therefrom via a second port 78. At step 110, the fluid reservoirs 80a,80b are then sealed, such as by closing or plugging the ports 78, to retain the fluid F therein.

With reference to FIG. 11B, in one method 200 of replacing one or more cells 10 of an assembled module 20, at step 202, fluid F is first removed from the fluid reservoirs 80a,80b, for example via fluid ports 78, if available. At step 204, one or both of the terminal covers 70a,70b are then removed by unfastening the connection means 38 to expose the cells 10. At step 206, one or more of the cells 10 can be removed and replaced with new cells 10. At step 208, the module 20 can then be reassembled via the previously described method.

For a module 20 designed to contain and connect cells 10 with terminals 12,14 located at the same end, the process of assembly is similar to that described above, with the exception that only a single terminal cover 70 is connected with the body 30 with a gasket 50 therebetween to form the first and second fluid reservoirs 80a,80b. The reservoirs 80a,80b can be filled with fluid F in the same manner as above.

Figure 14A:
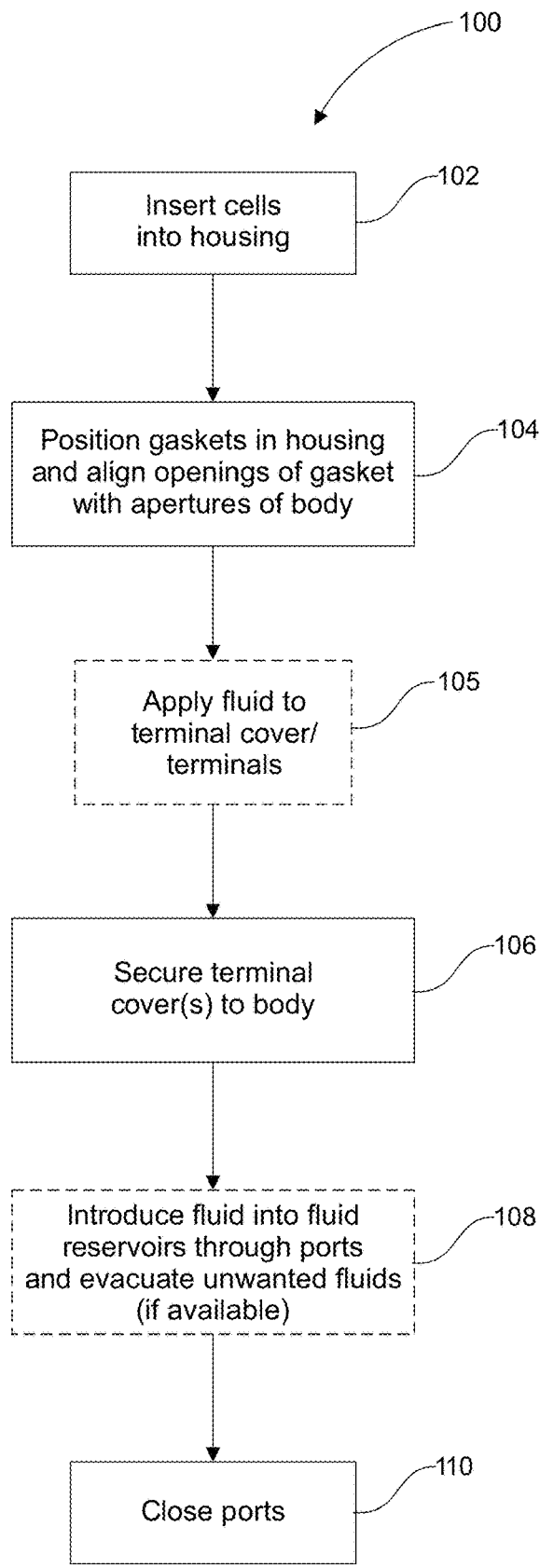
FIG. 14A is a flow diagram of a method of assembling a battery module.
Figure 14B:
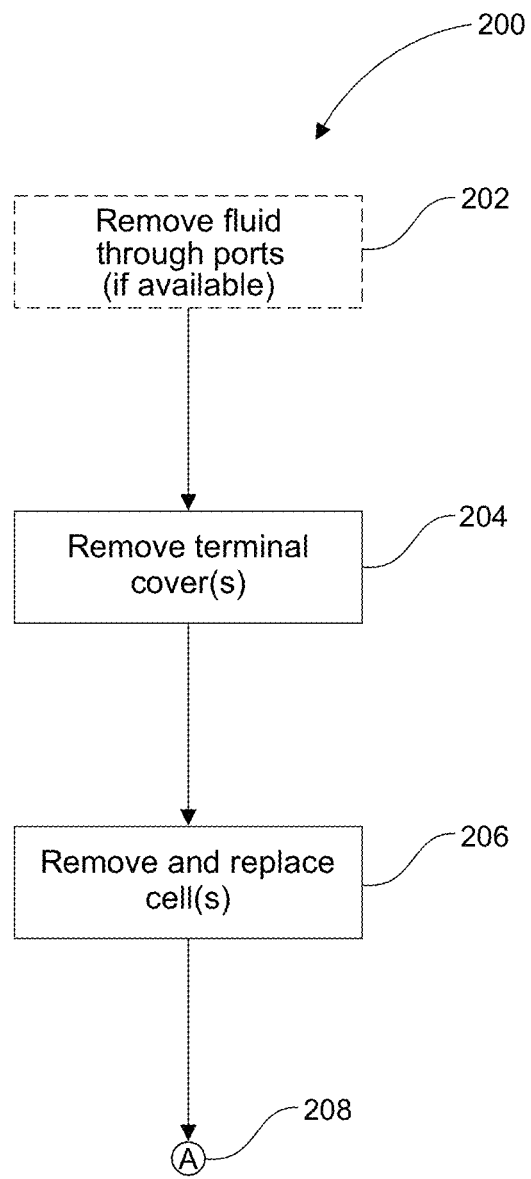
FIG. 14B is a flow diagram of a method of replacing a cell of a battery module.
Figure 14C:
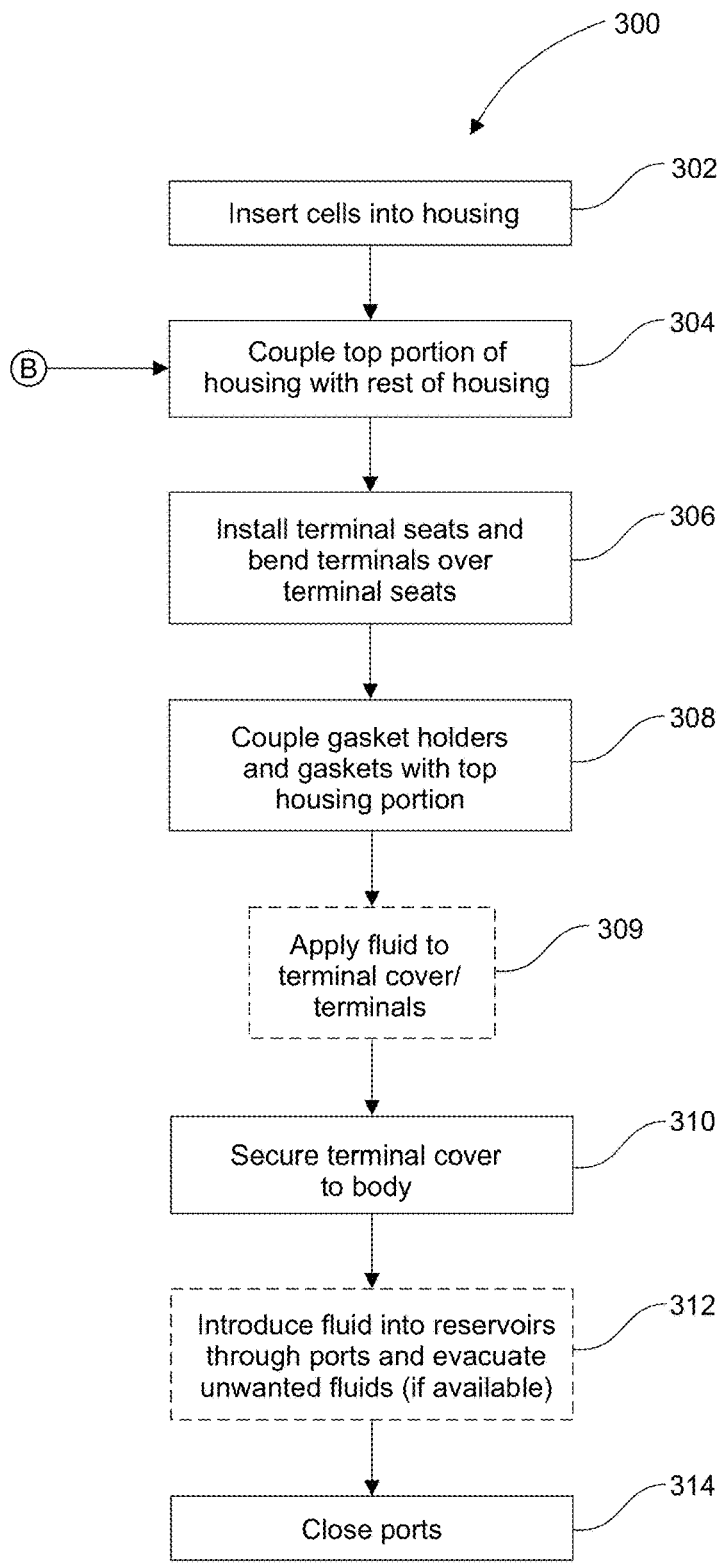
FIG. 14C is a flow diagram of a method for assembling a battery module having prismatic or fuel cells.
Figure 14D:
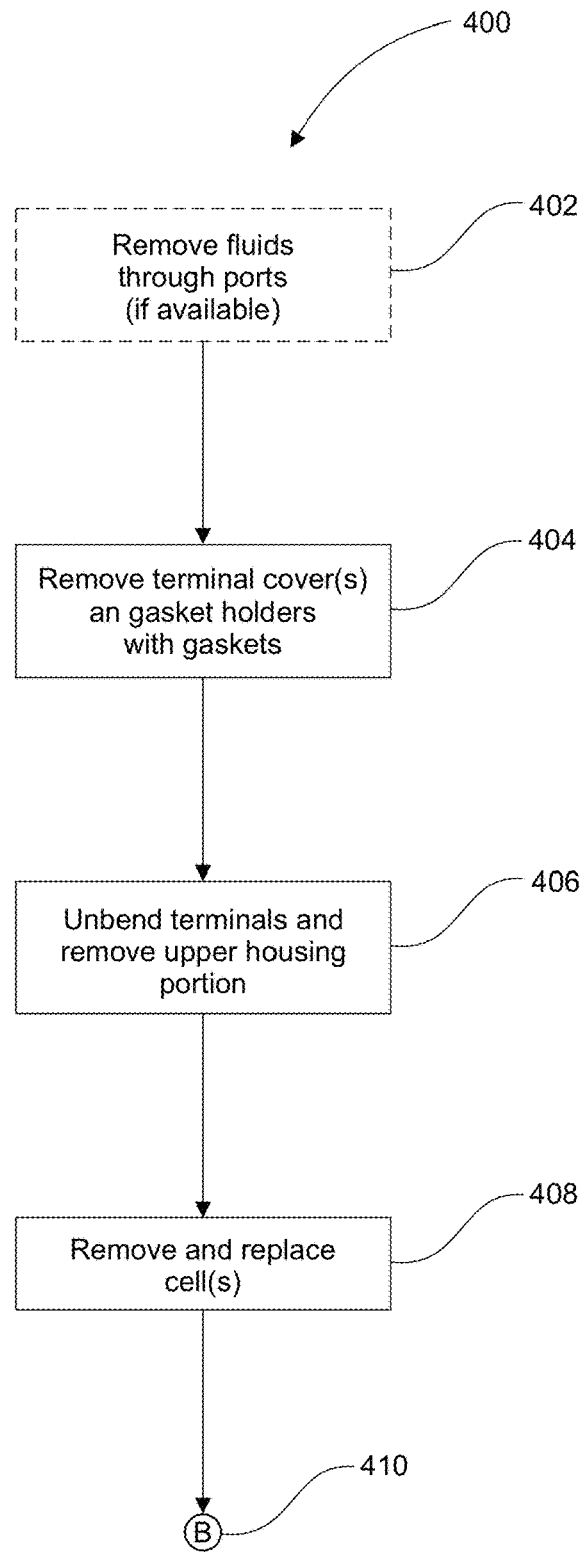
FIG. 14D is a flow diagram of a method of replacing a cell of a battery module having prismatic or fuel cells.

With reference to FIG. 14C, a process 300 is illustrated for assembling a module 20 to contain and connect prismatic or fuel cells 10, as depicted in FIGS. 11A to 13E. At step 302, the appropriate number of cells 10 are inserted into the housing 30. At step 304, with reference to FIG. 12B, the removable top portion 32 of the housing 30 is then coupled with the rest of the housing 30 by sliding the terminals 12,14 of the cells 10 through the apertures 42a,42b of the top portion 32. At step 306, the terminal seats 44 are then positioned in the top portion 32, for example in respective seats formed in the top portion 32, and the terminals 12,14 can be bent over the seats 44. At step 308, with reference to FIG. 12C, the one or more gasket holders 54 having gaskets 50 already installed in gasket seats thereof can be coupled to the first housing portion 32. At optional step 309, in embodiments, fluid F can first be applied to the cavities 76a,76b of the gasket holder(s) 54 and cell terminals 12,14. At step 310, with reference to FIG. 12D, the terminal cover 70 can then be coupled with the housing 30 and top housing portion 32 to form bulkhead 26 and such that the contacts 72a,72b thereof respectively contact the first and second terminals 12,14 of the cells. Connection means 38 can be used to secure the housing 30, top housing portion 32, and terminal cover 70 and compress the gaskets 50 such that they seal with the terminals 12,14, thus forming fluid reservoirs 80a,80b encompassing the electrical contacts 72a,72b and points of contact 82. At step 312, if fluid ports 78 are present, fluid F can be introduced into the fluid reservoirs 80a,80b via ports 78 of the terminal cover 70 or housing 30 such that the reservoirs 80a,80b are filled with fluid F an undesirable fluids are evacuated from a second port 78 of each reservoir. At step 314, the fluid reservoirs 80 are then sealed, to retain the fluid F therein.

With reference to FIG. 11D, in one method 400 of replacing one or more cells 10 of an assembled module 20, at step 402, fluid F is first removed from the fluid reservoirs 80a,80b, for example via fluid ports 78, if available. At step 404, the terminal cover 70 is removed and the gasket holder(s) 54 removed from the upper housing portion 32. At step 406, the terminals 12,14 are unbent and the upper housing portion 32 removed from the housing 30. At step 408, one or more of the cells 10 can be removed and replaced with new cells 10. At step 410, the module 20 can then be reassembled via the previously described method.

In embodiments wherein the module 20 houses and connects cells 10 with both terminals 12,14 located at the same end, the second portion 34 of the body need not create a sealed bulkhead 28 with the second ends 15 of the cells 10. Instead, the second portion 34 can simply provide a platform to brace the cells 10 against the force applied thereon by the conductive contacts 72 and terminal cover 70 when the module is assembled. In embodiments, suitably-shaped recesses can be provided in the second portion 34 for the second ends 15 of the cells 10 to be seated in to provide lateral stability thereto.

In embodiments wherein cylindrical cells 10 are to be connected in series rather than parallel, the module 20 can be assembled in the same manner as in the above method 100. However, instead, of inserting the cells 10 into the body 30 such that all of the cells are in the same orientation, the cells 10 can be oriented with an alternating polarity such that the terminals 12,14 of adjacent cells are opposite, as exemplified in FIGS. 12A and 12B. The conductor buses 74 of the terminal covers 70 are configured to connect the anode terminal 14a of a first cell 10a with the cathode terminal 12b of an adjacent second cell 10b, the anode terminal 14b of the second cell 10b with the cathode terminal 12c of an adjacent third cell 10c, and so on until the cells 10 of the module 20 are connected in series. FIG. 15B depicts a schematic representation of such a conductor configuration, wherein the solid lines depict first conductor buses 74a located within the first bulkhead 26a and the dotted lines depict second conductor buses 74b located in the second bulkhead 26b. Current I is shown flowing through the cells 10 and conductor buses 74 in series. In such embodiments, fluid F can be a non-conductive fluid, such as a dielectric grease, to prevent shorting between the first and second terminals 12,14 of cells 10.

Similarly, prismatic cells 10 can be connected in series in the same manner, wherein the cells 10 are oriented with an alternating polarity such that the terminals 12,14 of adjacent cells are opposite, as shown in FIG. 16. In such embodiments, the conductors 74 can again be configured to connect the anode terminal 14a of a first cell 10a to the cathode terminal 12b of a second cell 10b, the anode terminal 14b of the second cell 10b to the cathode terminal 12c of a third cell 10c, and so on until the cells 10 of the module 20 are connected in series. In an embodiment, the cavity 76 of the terminal cover 70 and the gaskets 50 can be configured such that the first and second terminals 12,14 of the cells 10 can be encompassed by a single fluid reservoir 80 formed between the body 30, cover 70, and gasket 50, and the reservoir 80 can be filled with a non-conductive fluid F to prevent shorting between the terminals 12,14. In another embodiment, the cavities 76 of the cover 70 or gasket holder(s) 54 can be configured to form multiple fluid reservoirs 80, each reservoir 80 encompassing a single pair of cathode and anode terminals 12,14 of adjacent cells 10 connected in series. In such embodiments, fluid F can be a conductive or non-conductive fluid. The remaining cathode and anode terminals 12,14, which in the depicted embodiment in FIG. 13 are terminals 12d and 14a, have their own respective fluid reservoirs 80 and are respectively connected to the module terminals 22,24.

The embodiments of the module 20 are described herein in the context of housing and connecting battery cells 10. However, the apparatus and methods described may be employed to with respect to any situation in which electrical connections are made between electrical components, and it is desirable to dampen external forces that may disrupt said connection and prevent oxidation thereof by removing oxygen. For example, the principles herein can be applied to improve the connections in an array of capacitors, fuel cells, resistors, fuses, or other connections between electrical components that may need to be changed and replaced over time.

While the apparatus and method have been described in conjunction with the disclosed embodiments and examples which are set forth in detail, it should be understood that this is by illustration only and the system and method are not intended to be limited to these embodiments. On the contrary, this disclosure is intended to cover alternatives, modifications, and equivalents which will become apparent to those skilled in the art in view of this disclosure.

We claim:

1. An apparatus for interconnecting a plurality of electrical components, each of the electrical components comprising a respective first terminal and a respective second terminal, the apparatus comprising:
a housing configured to retain the plurality of electrical components; and
one or more terminal bulkheads couplable to the housing to cover the first and second terminals of the electrical components, the one or more terminal bulkheads comprising:
one or more terminal covers defining one or more cavities;
first and second pluralities of electrical contacts disposed within the one or more cavities to contact the first terminals and the second terminals respectively; and
one or more gaskets defining gasket openings therethrough, the gasket openings collectively receiving the first and second terminals therethrough and sealingly engaging the electrical components;
wherein, when the one or more terminal bulkheads are coupled to the housing, the one or more cavities cooperate with the housing, the plurality of electrical components, and the one or more gaskets to define one or more fluid reservoirs encompassing the first and second terminals of the electrical components, and to define non-permanent points of contact between the first and second terminals of the electrical components and the electrical contacts within the one or more fluid reservoirs so as to enable access to the electrical components;
the one or more cavities of the one or more terminal covers, or the one or more fluid reservoirs being pre-filled during assembly with sufficient fluid displacing air at the non-permanent points of contact so as to passively protect against oxidation and corrosion and immersing the first and second terminals of the electrical components and the electrical contacts so as to protect against disconnection at the non-permanent points of contact during use;
wherein the one or more fluid reservoirs are sealed and isolated from an outside environment.

2. The apparatus of claim 1, wherein the one or more terminal bulkheads further comprise one or more gasket holders and the one or more gaskets are retained in the one or more gasket holders.

3. The apparatus of claim 1, further comprising one or more sealable fluid ports formed in one or both of the one or more terminal bulkheads and the housing, and in communication with the one or more fluid reservoirs.

4. The apparatus of claim 3, wherein the one or more sealable fluid ports comprises a plurality of sealable fluid ports, and each of the one or more fluid reservoirs is in communication with at least two of the plurality of sealable fluid ports.

5. The apparatus of claim 4, for each fluid reservoir, a first of the plurality of sealable ports is usable to introduce a fluid into the reservoir, and a second of the plurality of sealable ports is usable to evacuate ambient air from the reservoir, thereby filling the fluid reservoir with the fluid.

6. The apparatus of claim 1, wherein the one or more fluid reservoirs are filled with a non-conductive fluid.

7. The apparatus of claim 1, wherein the plurality of electrical components comprise at least one of: batteries; or fuel cells.

8. The apparatus of claim 1, further comprising one or more conductor buses each electrically connecting two or more electrical contacts of the first and second pluralities of electrical contacts.

9. The apparatus of claim 1, wherein:
each of the electrical components has a respective first end and a respective second end opposite to the first end, the first terminal is located at the first end, and the second terminal is located at the second end; and
the one or more terminal bulkheads comprise a first terminal bulkhead couplable to the housing to cover the first ends and the first terminals, and a second terminal bulkhead couplable to the housing to cover the second ends and second terminals of the electrical components.

10. The apparatus of claim 9, wherein:
the first terminal bulkhead comprises: a first terminal cover of the one or more terminal covers; the first plurality of electrical contacts; and a first gasket of the one or more gaskets; and
the second terminal bulkhead comprises: a second terminal cover of the one or more terminal covers; the second plurality of electrical contacts; and a second gasket of the one or more gaskets.

11. The apparatus of claim 9, wherein:
the housing comprises a first portion, a second portion, and an intermediate portion interconnecting the first and second portions; and
the first and second portions define a plurality of apertures configured to receive the plurality of electrical components.

12. The apparatus of claim 1, wherein each of the electrical components has a respective first end, the first and second terminals are each located at the first end, and wherein the one or more terminal bulkheads cover the first ends and first and second terminals of the electrical components.

13. The apparatus of claim 12, wherein each opening of the one or more gaskets receives the first and second terminals of a respective one of the electrical components.

14. The apparatus of claim 1, wherein, for each of the one or more terminal bulkheads, a respective gasket of the one or more gaskets is positioned between the housing and a respective terminal cover of the one or more terminal covers.

15. The apparatus of claim 1, wherein the one or more one fluid reservoirs are filled with an inert fluid.

16. The apparatus of claim 1, wherein the plurality of electrical components comprise at least one of: fuses; capacitors; or resistors.

17. A method comprising:
positioning a plurality of electrical components in a housing, each electrical component comprising a respective first terminal and a respective second terminal;
coupling one or more terminal bulkheads to the housing to cover the first and second terminals of the electrical components, the one or more terminal bulkheads and the housing forming one or more fluid reservoirs encompassing the first and second terminals of the electrical components, wherein the one or more terminal bulkheads comprise: a terminal cover defining one or more cavities; first and second pluralities of electrical contacts disposed within the one or more cavities to contact the first terminals and the second terminals respectively; and one or more gaskets defining gasket openings therethrough that receive the first and second terminals and sealingly engage the electrical components; wherein, the one or more cavities cooperate with the housing, the plurality of electrical components, and the one or more gaskets to define the one or more fluid reservoirs and to define non-permanent points of contact between the first and second terminals of the electrical components and the first and second pluralities of electrical contacts within the one or more fluid reservoirs so as to enable access to the electrical components;
pre-filling a fluid into the one or more cavities of the one or more terminal covers or the one or more fluid reservoirs, the fluid displacing air at the non-permanent points of contact so as to passively protect against oxidation and corrosion and immersing the first and second terminals of the electrical components and the electrical contacts so as to protect against disconnection at the non-permanent points of contact during use; and
sealing the one or more fluid reservoirs from an outside environment.

18. The method of claim 17, wherein the step of pre-filling the fluid into the one or more fluid reservoirs comprises, for each fluid reservoir, pre-filling the fluid using a first sealable port in fluid communication with the fluid reservoir.

19. The method of claim 18, wherein the step of pre-filling the fluid into the one or more fluid reservoirs further comprises, for each fluid reservoir, evacuating air from the fluid reservoir using a second sealable port in fluid communication with the fluid reservoir.

20. A system comprising:
a plurality of electrical components, each of the electrical components comprising a respective first terminal and a respective second terminal;
a housing retaining the plurality of electrical components; and
one or more terminal bulkheads coupled to the housing to cover the first and second terminals of the electrical components, the one or more terminal bulkheads comprising:
one or more terminal covers defining one or more cavities;
first and second pluralities of electrical contacts disposed within the one or more cavities to contact the first terminals and the second terminals respectively; and
one or more gaskets defining gasket openings therethrough, the gasket openings collectively receiving the first and second terminals therethrough and sealingly engaging the electrical components;
wherein, the one or more cavities cooperate with the housing, the plurality of electrical components, and the one or more gaskets to define one or more fluid reservoirs encompassing the first and second terminals of the electrical components, and to define non-permanent points of contact between the first and second terminals of the electrical components and the electrical contacts within the one or more fluid reservoirs so as to enable access to the electrical components;

the one or more cavities of the one or more terminal covers, or the one or more fluid reservoirs being pre-filled during assembly with sufficient fluid displacing air at the non-permanent points of contact so as to passively protect against oxidation and corrosion and immersing the first and second terminals of the electrical components and the electrical contacts so as to protect against disconnection at the non-permanent points of contact during use; and wherein the one or more fluid reservoirs are filled with a fluid and are sealed and isolated from an outside environment.

\* \* \* \* \*